US 10,030,362 B2

(12) United States Patent
Yamashita et al.

(10) Patent No.: US 10,030,362 B2
(45) Date of Patent: Jul. 24, 2018

(54) CABIN OF WORKING MACHINE, WORKING MACHINE HAVING CABIN, AND METHOD FOR MANUFACTURING CABIN

(71) Applicant: KUBOTA CORPORATION, Osaka (JP)

(72) Inventors: Yuji Yamashita, Osaka (JP); Hiroaki Kurachi, Osaka (JP); Masahiro Kuroda, Osaka (JP); Hiroyuki Anami, Osaka (JP); Toshihiko Takemura, Osaka (JP); Satoshi Tajima, Osaka (JP); Kunihiro Suzuki, Osaka (JP); Hayato Kawano, Osaka (JP); Hideo Imai, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 213 days.

(21) Appl. No.: 14/862,401

(22) Filed: Sep. 23, 2015

(65) Prior Publication Data
US 2016/0090713 A1    Mar. 31, 2016

(30) Foreign Application Priority Data

Sep. 30, 2014 (JP) .................. 2014-202387
Sep. 30, 2014 (JP) .................. 2014-202392
Sep. 30, 2014 (JP) .................. 2014-202400

(51) Int. Cl.
*B62D 33/06*    (2006.01)
*E02F 9/16*    (2006.01)
(Continued)

(52) U.S. Cl.
CPC ............... *E02F 9/163* (2013.01); *B62D 5/02* (2013.01); *B62D 33/06* (2013.01); *E02F 3/3414* (2013.01); *E02F 9/0858* (2013.01)

(58) Field of Classification Search
CPC ........ B62D 33/06; E02F 9/163; E02F 3/3414; E02F 9/0858; B60J 5/02
(Continued)

(56) References Cited

U.S. PATENT DOCUMENTS 5,076,635 A * 12/1991 Larkin ............... B60J 1/1861
                                                    296/146.16
5,096,253 A *  3/1992 Jo .................... B60J 1/04
                                                    296/190.1
8,303,026 B2 * 11/2012 Yamashita ......... B62D 33/0617
                                                    296/146.16

FOREIGN PATENT DOCUMENTS

JP    2002307942 A    10/2002
JP    2004-291695     10/2004
(Continued)

OTHER PUBLICATIONS

Japanese Office Action in counterpart application No. 2014-202400, dated Sep. 19, 2017.
(Continued)

*Primary Examiner* — Joseph D. Pape
(74) *Attorney, Agent, or Firm* — Greenblum & Bernstein, P.L.C.

(57) ABSTRACT

A cabin includes: a panel disposed on a side of an operator seat, the panel including: a plurality of cross members extending in a first direction; and a plurality of transverse members intersecting with the plurality of cross members each other and extending in a second direction; a glass panel disposed on a side of the panel; a window frame disposed on the glass panel; a window panel disposed on the window frame, the window panel being configured to move in the first direction or in the second direction; a projecting member disposed on a side of the window panel, the side being an identical side to the operator seat, the projecting member being configured to move together with the window panel;
(Continued)

and a guide portion configured to accept insertion of the projecting member and to limit a moving distance of the window panel.

5 Claims, 22 Drawing Sheets

(51) Int. Cl.
  *E02F 3/34* (2006.01)
  *B62D 5/02* (2006.01)
  *E02F 9/08* (2006.01)
(58) Field of Classification Search
  USPC .......................................... 296/190.11, 190.1
  See application file for complete search history.

(56) References Cited

FOREIGN PATENT DOCUMENTS

| JP | 2006029081 A | 2/2006 |
|---|---|---|
| JP | 2010-65436 | 3/2010 |
| JP | 2011-207287 | 10/2011 |
| JP | 2013-248997 | 12/2013 |

OTHER PUBLICATIONS

Office Action issued in Japan Counterpart Patent Appl. No. 2014-202392, dated Nov. 28, 2017.

* cited by examiner

CABIN OF WORKING MACHINE, WORKING MACHINE HAVING CABIN, AND METHOD FOR MANUFACTURING CABIN

CROSS-REFERENCE TO RELATED APPLICATIONS

The present application claims priority under 35 U.S.C. § 119 to Japanese Patent Application No. 2014-202387, filed Sep. 30, 2014, to Japanese Patent Application No. 2014-202392, filed Sep. 30, 2014, and to Japanese Patent Application No. 2014-202400, filed Sep. 30, 2014. The contents of this application are incorporated herein by reference in their entirety.

BACKGROUND OF THE INVENTION

Field of the Invention

The present invention relates to a cabin of a working machine, the working machine having the cabin, and a method for manufacturing the cabin, and especially relates to a cabin of a working machine such as a skid steer loader, a track loader, and a compact track loader, the working machine having the cabin, and a method for manufacturing the cabin.

Description of Related Art

A working machine normally includes a cabin, the working machine being called a loader such as a Skid Steer Loader (SSL), a Track Loader (TL), and a Compact Track Loader (CTL). Japanese Unexamined Patent Application Publication No. 2010-65436 discloses a side structure of a cabin. The side structure is constituted of a side panel and a glass panel, the side panel having a lattice structure (being a grille) and being covered with the glass panel, that is so-called a double-plate structure. The cabin including the side structure is known.

The lattice structure (the grille) is formed of: a plurality of vertically extending strips; and a plurality of horizontally extending strips. The side panel of the cabin disclosed in Japanese Unexamined Patent Application Publication No. 2010-65436 employs the lattice structure.

A working machine normally has an air conditioner (an air conditioning machine) as disclosed, for example, in Japanese Unexamined Patent Application Publication No. 2004-291695, the working machine including a cabin mounted on a body of the working machine, the working machine being called a loader such as a Skid Steer Loader (SSL), a Track Loader (TL), and a Compact Track Loader (CTL). The air conditioner cools an inside of the cabin mounted on the body of the working machine. The working machine including the air conditioner is known.

The working machine disclosed in Japanese Unexamined Patent Application Publication No. 2004-291695 includes an inlet member on a rear portion of a roof member constituting the cabin so that the inlet member protrudes backward, the inlet member having an external air inlet serving as a duct for introducing the external air. The working machine disposes a filter inside the inlet member having the external air inlet.

Japanese Unexamined Patent Application Publication No. 2011-207287 discloses a cabin of a working machine.

The cabin includes an operator seat, a frame portion, a roof, and a front panel. The frame portion is disposed in front of the operator seat to form an opening for getting on and off the working machine. The roof is disposed above the operator seat. The front panel is capable of being moved between a first position and a second position, the first position being a position for the front panel to close the opening, the second position being a position between the operator seat and the roof.

In the above-mentioned working machine, the front panel is provided with a latch on an upper portion of the front panel, and the frame portion is provided with a first striker. The latch of the front panel can be engaged to the first striker of the frame portion when the front panel is moved to be set at the first position. And, the roof is provided with a second striker on a rear portion of the roof. The latch of the front panel can be engaged to the second striker of the roof when the front panel is moved to be set at the second position. The working machine is provided with a lock member. The lock member is configured to catch a certain position of the front panel, the certain position being opposite to the latch, thereby holding the front panel.

The lock member is provided on the front panel and is capable of freely moving in a direction along a width of the front panel. The cabin is provided with a hold member in a room of the cabin, the hold member being engaged to the lock member to hold the front panel at the second position.

The lock member can be moved toward a right side or a left side of the cabin when the front panel is moved to be set at the second position, thereby being engaged to the hold member. The lock member is continuously pressed by a pressing member toward a direction in which the lock member is engaged to the hold member. In addition, the pressing member continuously presses the lock member to the hole member after the lock member is engaged to the hold member once. When the lock member engaged to the hold member is moved from the hold member against the pressing force of the pressing member, the lock member can slip out from the hold member.

BRIEF SUMMARY OF THE INVENTION

Problems to be Solved by the Invention

In a manufacturing process of the side panel, the press forming molds a plate to form a lattice structure (form a grille plate) at first. Then, the grille plate is assembled on a frame body by the welding or by using bolts, thereby being integrated with the frame body to form the side panel. However, the grille plate and the frame body are separately prepared and are is integrated with each other by the assembling. The side panel accordingly has a limitation on improvement of precision and strength even when the grille plate has adequate precision and the frame body has adequate precision.

To solve the above mentioned problems, the present invention intends to provide: a cabin of a working machine, the cabin including a side panel fabricated with high precision and high strength; and a working machine having the cabin.

In addition, the above mentioned conventional duct (the external air inlet) is manufactured as a component formed separately from the cabin, and is additionally attached to the cabin. Thus, the cabin has problems, that is, the number of components is large and the number of manufacturing processes is large, for example.

To solve the above mentioned problems, the present invention intends to provide: a cabin of a working machine, the cabin being capable of easily forming the duct for introducing the external air; and a working machine having the cabin.

Furthermore, the lock member is continuously pressed by the pressing member toward the direction in which the lock member is engaged to the hold member, and protrudes toward the direction along the width of the front panel (here referred to as a side direction). The lock member moves together with the front panel moving between the first position and the second position. When the front panel moves between the first position and the second position together with the lock member protruding toward the side direction, the lock member will hit something arranged in the cabin.

To solve the above mentioned problems, the present invention intends to provide: a cabin capable of preventing the hitting of the lock member; and a working machine having the cabin.

Means of Solving the Problems

To solve the above-mentioned technical problems, techniques that the present invention provides are characterized in the following points.

In a first aspect of the present invention, a cabin includes: an operator seat; and a panel disposed on a side of the operator seat, the panel including: a plurality of cross members extending along a front to rear direction and being disposed horizontally at a predetermined interval; a plurality of transverse members intersecting with the plurality of cross members each other and being disposed vertically at a predetermined interval; a first reinforcement portion formed on at least one of the cross members or on at least one of the transverse members; and a frame member configured to connect between end portions of the cross members and between end portions of the transverse members, the plurality of cross members and the plurality of transverse members forming a grille.

In a second aspect of the present invention, the cabin according to the first aspect of the present invention, includes: a glass panel disposed on a side of the panel, the side being opposite to the operator seat; a window frame disposed on the glass panel; a window panel disposed on the window frame, the window panel being capable of moving forward and backward in the window frame; a projecting member disposed on a side of the window panel, the side being an identical side to the operator seat, the projecting member being capable of moving forward and backward together with the window panel; a guide portion configured to accept insertion of the projecting member and to limit a moving distance of the window panel, the guide portion being constituted of the cross members and the transverse members.

In a third aspect of the present invention, the first reinforcement portion protrudes toward a side opposite to the operator seat.

In a fourth aspect of the present invention, the cabin according to the first aspect of the present invention, includes: a frame member forming an entrance opening, the frame member being disposed in front of the operator seat; and an operation member disposed on a corner portion between the panel and the frame member forming the entrance opening.

In a fifth aspect of the present invention, a cabin includes: an operator seat; a panel disposed on a side of the operator seat, the panel including: a plurality of cross members extending along a front to rear direction and being disposed horizontally at a predetermined interval; a plurality of transverse members intersecting with the plurality of cross members each other and being disposed vertically at a predetermined interval; and a frame member configured to connect between end portions of the cross members and between end portions of the transverse members; a glass panel disposed on a side of the panel, the side being opposite to the operator seat; a window frame disposed on the glass panel; a window panel disposed on the window frame, the window panel being capable of moving forward and backward in the window frame; a projecting member disposed on a side of the window panel, the side being an identical side to the operator seat, the projecting member being capable of moving forward and backward together with the window panel; and a guide portion configured to accept insertion of the projecting member and to limit a moving distance of the window panel, wherein the plurality of cross members and the plurality of transverse members form a grille and the guide portion.

In a sixth aspect of the present invention, the window frame is disposed on a side of the glass panel, the side being an identical side to the operator seat, the glass panel including: a rim forming an opening in a front portion of the window frame, and the window panel closes the opening by moving forward in the window frame, and opens the opening by moving backward in the window frame.

In a seventh aspect of the present invention, the guide portion is disposed on a position corresponding to a rear portion of the panel.

In an eighth aspect of the present invention, a working machine includes: the cabin according to the first aspect of the present invention; a machine body configured to support the cabin; an operation device disposed on the machine body, the operation device including: a right boom disposed on a right side of the cabin and being capable of freely swinging upward and downward; a left boom disposed on a left side of the cabin and being capable of freely swinging upward and downward; and an operation tool supported on front portions of the right boom and the left boom; a right travel device disposed on a right side of the machine body; and a left travel device disposed on a left side of the machine body.

In a ninth aspect of the present invention, a method for manufacturing the cabin according to the first aspect of the present invention, includes: forming the grille in a plate member constituting the panel; and forming the first reinforcement portion by pressing the plate member in a press forming process, the plate member including the grille.

In a tenth aspect of the present invention, a cabin includes: an operator seat; a panel disposed on a side of the operator seat; an outer peripheral portion disposed in the panel, the outer peripheral portion including: a rim forming an opening; a first plate portion facing the outer peripheral portion, the first plate portion being disposed on a side opposite to the operator seat; a second plate portion connected to the first plate portion at one end of the second plate portion and connected to the outer peripheral portion at the other end of the second plate portion; and a duct formed of the outer peripheral portion, the first plate portion, and the second plate portion, the duct being communicated with the opening.

In an eleventh aspect of the present invention, the outer peripheral portion includes: an upper plate portion constituting an upper portion of the panel, and the rim is disposed in the upper plate portion.

In an twelfth aspect of the present invention, the cabin according to the tenth aspect of the present invention, includes: a filter inserted to the rim; and a cover includes: a plurality of louver portions each having an air inlet, the cover covering the filter.

In a thirteenth aspect of the present invention, the cabin according to the twelfth aspect of the present invention, includes: a shield member disposed on a side of the louver portion, the side being opposite to the outer peripheral portion.

In a fourteenth aspect of the present invention, the shield member includes: a plurality of plates extending along a front to rear direction and being disposed vertically at a predetermined interval; joint portions each jointing the plates.

In a fifteenth aspect of the present invention, the plates are disposed between the louver portions.

In a sixteenth aspect of the present invention, the shield member includes: a fixation member configured to be fixed to the cover.

In a seventeenth aspect of the present invention, a working machine includes: the cabin according to the tenth aspect of the present invention; a machine body configured to support the cabin; an operation device disposed on the machine body, the operation device including: a right boom disposed on a right side of the cabin and being capable of freely swinging upward and downward; a left boom disposed on a left side of the cabin and being capable of freely swinging upward and downward; and an operation tool supported on front portions of the right boom and the left boom; a right travel device disposed on a right side of the machine body; and a left travel device disposed on a left side of the machine body.

In an eighteenth aspect of the present invention, a cabin includes: an operator seat; a frame member forming an entrance opening, the frame member being disposed in front of the operator seat; a roof arranged above the operator seat; a first panel configured to be capable of being moved to a first position where the front panel closes the entrance opening and to a second position between the operator seat and the roof; a lock member disposed on the first panel, the lock member being configured to be freely movable; a holding member configured to be engaged to the lock member to hold the first panel at the second position; and a pressing member configured to press the lock member toward a direction opposite to a direction of engaging to the holding member.

In a nineteenth aspect of the present invention, the cabin according to the eighteenth aspect of the present invention, includes: a second panel disposed on a side of the operator seat, wherein the holding member is disposed on an upper portion of the front portion of the second panel.

In a twentieth aspect of the present invention, the cabin according to the eighteenth aspect of the present invention, includes: a support member configured to support the lock member, the support member being disposed on the first panel; a first receiving portion disposed on the support member; and a second receiving portion disposed on the lock member, wherein the pressing member is disposed between the first receiving portion and the second receiving portion.

In a twenty-first aspect of the present invention, the cabin according to the eighteenth aspect of the present invention, includes: a first striker disposed on an upper portion of the frame member, the first striker projecting downward, wherein the first panel includes: a rim disposed on a portion corresponding to the first striker at the first position; and a latch disposed on the rim, the latch configured to be engaged to the first striker.

In a twenty-second aspect of the present invention, the cabin according to the twenty-first aspect of the present invention, includes: a second striker configured to protrude forward and to be engaged to the latch at the second position, the second striker being disposed behind the operator seat and under the roof.

In a twenty-third aspect of the present invention, a working machine includes: the cabin according to the eighteenth aspect of the present invention; a machine body configured to support the cabin; an operation device disposed on the machine body, the operation device including: a right boom disposed on a right side of the cabin and being capable of freely swinging upward and downward; a left boom disposed on a left side of the cabin and being capable of freely swinging upward and downward; and an operation tool supported on front portions of the right boom and the left boom; a right travel device disposed on a right side of the machine body; and a left travel device disposed on a left side of the machine body.

Effects of the Invention

A cabin of a working machine according to the present invention, comprises: an operator seat; and a panel disposed on a side of the operator seat, the panel including: a plurality of cross members extending along a front to rear direction and are disposed horizontally at predetermined intervals; a plurality of transverse members intersecting with the plurality of cross members each other and are disposed vertically at predetermined intervals; a first reinforcement portion formed on at least one of the cross members or on at least one of the transverse members; and a frame member configured to connect between end portions of the cross members and between end portions of the transverse members, the plurality of cross members and the plurality of transverse members forming a grille. In this manner, stiffness of the side panel having the grille is improved by the first reinforcement portion.

Additionally, in a conventional side panel, a grille plate and a frame are assembled integrally after the grille plate and the frame are separately manufactured. Meanwhile, in the present invention, a grille and the frame member can be manufactured at the same time by the press forming process, thereby further improving precision of the side panel. That is, the present invention can provide a side panel manufactured with high precision and high strength.

In addition, a cabin of a working machine according to the present invention, comprises: an operator seat; a panel disposed on a side of the operator seat; an outer peripheral portion disposed in the panel, the outer peripheral portion including: a rim forming an opening; a first plate portion facing the outer peripheral portion, the first plate portion being disposed on a side opposite to the operator seat; a second plate portion connected to the first plate portion at one end of the second plate portion and connected to the outer peripheral portion at the other end of the second plate portion; and a duct formed of the outer peripheral portion, the first plate portion, and the second plate portion, the duct being communicated with the opening. In this manner, a part of the duct can be constituted of the outer peripheral portion of the side panel, the side panel constituting the cabin, and accordingly the number of parts for forming the duct can be reduced and the number of manufacturing processes also can be reduced.

Moreover, in a cabin of a working machine according to the present invention, a pressing member is configured to press the lock member toward a direction opposite to a direction of the engagement to the holding member, and accordingly the first panel moves between the first position and the second position under a state the lock member is pressed backward from the holding member. In this manner, the lock member can be prevented from hitting something disposed in the cabin in the move of the first panel between the first position and the second position.

DESCRIPTION OF THE EMBODIMENTS

Referring to drawings, an embodiment of the present invention will be described below.

Figure 21:
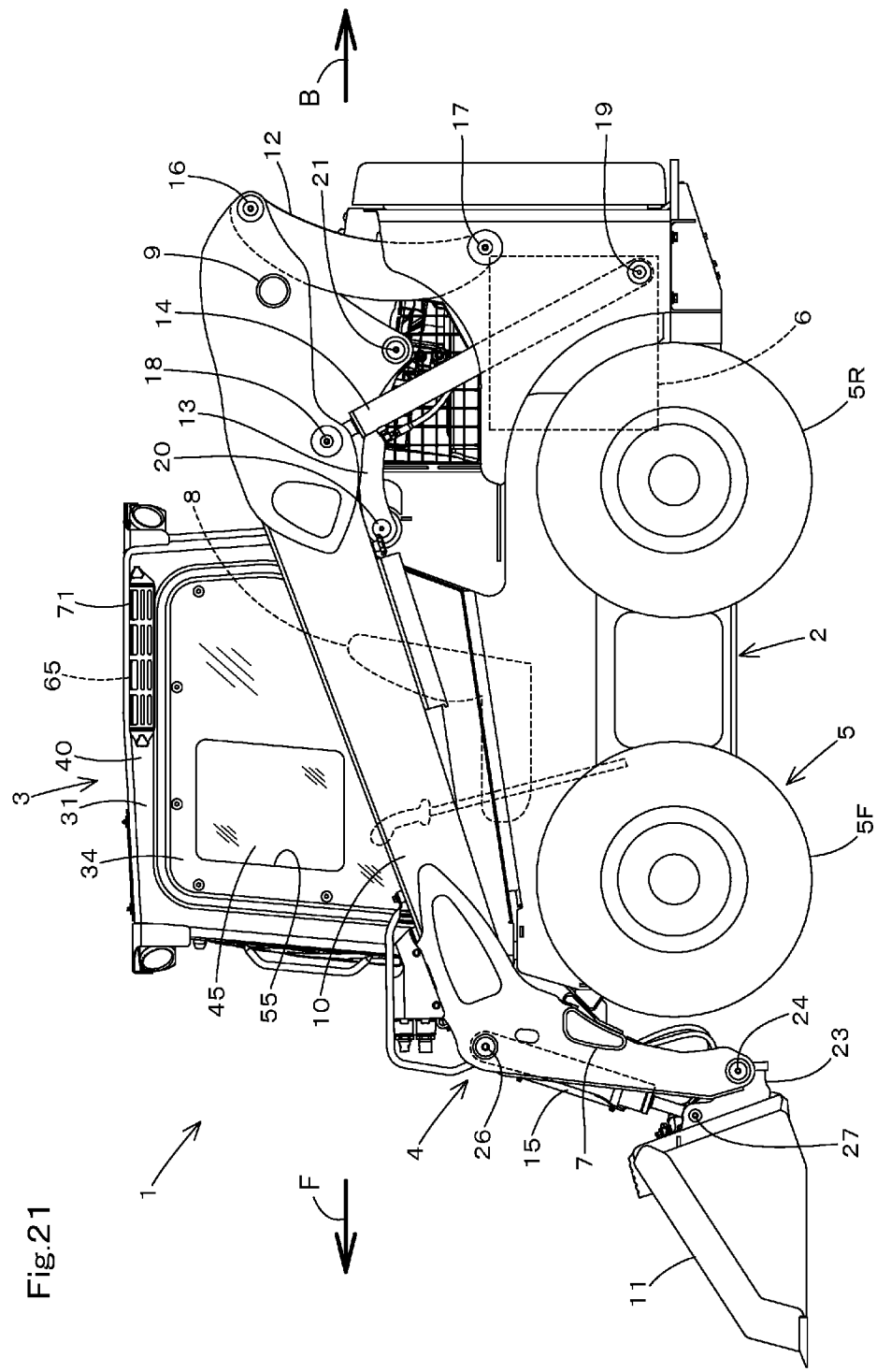
FIG. 21 is a side view of a working machine according to the embodiment.
Figure 22:
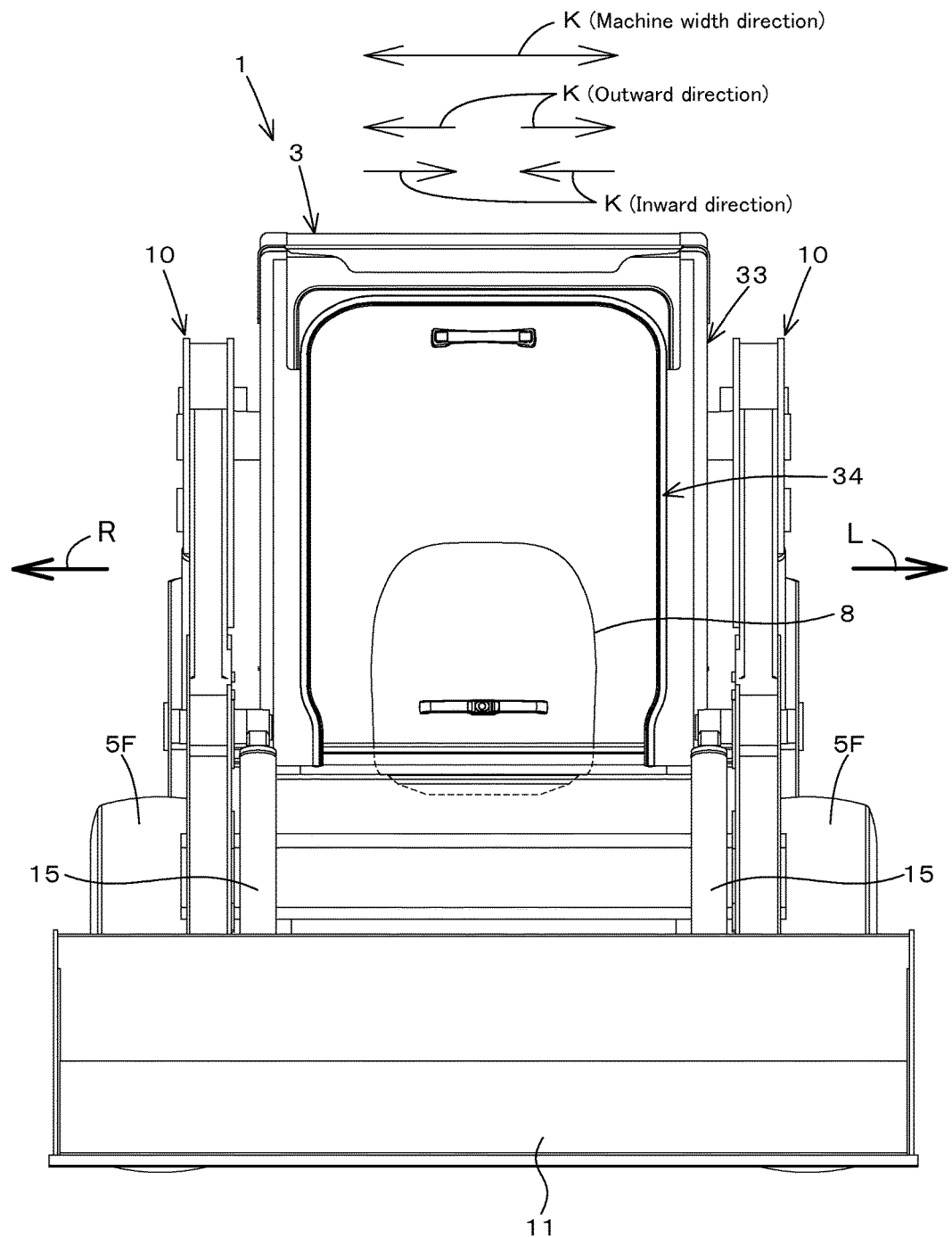
FIG. 22 is a front view of the working machine according to the embodiment.

FIG. 21 is a side view of a working machine according to an embodiment of the present invention. FIG. 22 is a front view of the working machine according to the embodiment of the present invention. FIG. 21 and FIG. 22 show a Skid Steer Loader (SSL) as an example of the working machine of the present invention. The working machine of the present invention is not limited to the Skid Steer Loader (SSL), and can be other types of the working machine, for example, a Track Loader (TL), a Compact Track Loader (CTL), and the like.

The skid steer loader 1 is the working machine according to the embodiment. The skid steer loader 1 includes a body 2 of the working machine (hereinafter referred to as a machine body 2), a cabin 3, an operation device 4, and travel devices 5. The cabin 3 is mounted on the machine body 2. The operation device 4 is attached on the machine body 2. The skid steer loader 1 includes two travel devices 5; one of the travel devices 5 is provided on a right side of the machine body 2, and the other one is provided on a left side of the machine body 2. A motor 6 is mounted on a rear portion of the machine body 2. An operator seat 8 is provided in the cabin 3. The motor 6 is an engine, an electric motor, and the like. The skid steer loader 1 according to the embodiment employs a diesel engine. Hereinafter, in explanations of the embodiment of the present invention and in explanations of the modified examples of the embodiment, a forward direction (a direction shown by an arrowed line F in FIG. 21) corresponds to a front side of an operator seating on the operator seat 8 of the skid steer loader 1, a backward direction (a direction shown by an arrowed line B in FIG. 21) corresponds to a back side of the operator, a leftward direction (a direction shown by an arrowed line L in FIG. 22) corresponds to a left side of the operator, and a rightward direction (a direction shown by an arrowed line R in FIG. 22) corresponds to a right side of the operator.

In addition, in explanations of the embodiment of the present invention and in explanations of the modified examples of the embodiment, a direction from the front side shown by the arrowed line F toward the back side shown by the arrowed line B (or a direction from the back side shown by the arrowed line B toward the front side shown by the arrowed line A) is referred to as a front to rear direction (or a rear to front direction), and a horizontal direction perpendicular to the front to rear direction (or the rear to front direction) is a direction K along a width of the machine body 2. The direction K along the width of the machine body 2 is hereinafter referred to as the machine width direction K. As shown in FIG. 22, in the following description, a direction from a center portion of the machine body 2 toward the above mentioned right side can be referred to as an outward direction. And, a direction from the center portion of the machine body 2 toward the above mentioned left side can be also referred to as the outward direction. The outward direction is hereinafter referred to as a machine outward direction. In other words, the machine outward direction corresponds to a direction departing from the center portion of the machine body 2 in the machine width direction K. A direction opposite to the machine outward direction can be referred to as an inward direction. The inward direction is hereinafter referred to as a machine inward direction. In other words, the machine inward direction corresponds to a direction toward the center portion of the machine body 2 in the machine width direction K.

As shown in FIG. 21 and FIG. 22, the operation device 4 includes booms 10, an operation tool 11, lift links 12, control links 13, boom cylinders 14, and bucket cylinders 15.

The operation device 4 includes two booms 10; one of the booms 10 is provided on a right side of the cabin 3 (referred to as the right boom 10) and is capable of freely swinging upward and downward, and the other one is provided on a left side of the cabin 3 (referred to as the left boom 10) and is capable of freely swinging upward and downward. The operation tool 11 is a bucket (hereinafter referred to as a bucket 11), for example. The bucket 11 is provided on tip portions (front end portions) of the booms 10 and is capable of freely swinging upward and downward. The lift link 12 and the control link 13 support a base portion (a rear portion) of the boom 10 so that the boom 10 is capable of freely swinging upward and downward. The boom cylinder 14 is capable of being stretched and shortened, thereby moving the boom 10 upward and downward. The bucket cylinder 15 is capable of being stretched and shortened, thereby swinging the bucket 11.

The operation device 4 includes a joint pipe 7 having a deformed shape, that is, the joint pipe 7 being a deformed pipe. The joint pipe 7 is connected to a front portion of the right boom 10 and to a front portion of the left boom 10 between the right boom 10 and the left boom 10, thereby jointing the right boom 10 and the left boom 10 with each other. The operation device 4 includes two lift links 12, two control links 13, and two boom cylinders 14. One of the lift links 12 (the right lift link 12), one of the control links 13 (the right control link 13), and one of the boom cylinders 14 (the right boom cylinder 14) are provided on a right side of the machine body 2, corresponding to the right boom 10 (also referred to as the corresponding boom 10). And, the other one of the lift links 12 (the left lift link 12), the other one of the control links 13 (the left control link 13), and the other one of the boom cylinders 14 (the left boom cylinder 14) are provided on a left side of the machine body 2, corresponding to the left boom 10 (also referred to as the corresponding boom 10).

The lift link 12 is vertically provided on a rear portion of the base portion of the boom 10. The lift link 12 is supported at an upper portion of the lift link 12 by a pivot shaft 16 (a first pivot shaft) to be capable of freely turning around a horizontal axis of the pivot shaft 16, the lift link 12 being supported on the rear portion of the base portion of the boom 10 by the pivot shaft 16. In addition, the lift link 12 is supported at a lower portion of the lift link 12 by a pivot shaft 17 (a second pivot shaft) to be capable of freely turning around a horizontal axis of the pivot shaft 17, the lift link 12 being supported on the rear portion of the machine body 2 by the pivot shaft 16. The second pivot shaft 17 is disposed lower than the first pivot shaft 16.

The boom cylinder 14 is supported at an upper portion of the boom cylinder 14 by a pivot shaft 18 (a third pivot shaft) to be capable of freely turning around a horizontal axis of the pivot shaft 18. The third pivot shaft 18 is disposed on the base portion of the boom 10 in front of the first pivot shaft 16. The boom cylinder 14 is supported at a lower portion of the boom cylinder 14 by a pivot shaft 19 (a fourth pivot shaft) to be capable of freely turning around a horizontal axis of the pivot shaft 19. The fourth pivot shaft 19 is disposed on a lower portion of the rear portion of the machine body 2, being lower than the third pivot shaft 18.

The control link 13 is disposed in front of the lift link 12. One end of the control link 13 is supported by a pivot shaft 20 (a fifth pivot shaft) to be capable of freely turning around a horizontal axis of the pivot shaft 20. The fifth pivot shaft 20 is disposed on the machine body 2. The other end of the control link 13 is supported by a pivot shaft 21 (a sixth pivot shaft) to be capable of freely turning around a horizontal axis of the pivot shaft 21. The sixth pivot shaft 21 is disposed on the boom 10 in front of the second pivot shaft 17, being higher than the second pivot shaft 17.

Stretching and shortening of the boom cylinder 14 swing the boom 10 upward and downward around the first pivot shafts 16, the boom 10 being supported on the base portion of the boom 10 by the lift link 12 and the control link 13, thereby moving a tip portion of the boom 10 upward and downward. The control link 13 is swung upward and downward around the fifth pivot shaft 20 by the swinging upward and downward of the boom 10. The lift link 12 is swung forward and backward around the second pivot shaft 17 by the swinging upward and downward of the control link 13.

An attachment body 23 is pivotally supported on the front portions (the tip portions) of the booms 10, The bucket 11 is attached to the attachment body 23 and is capable of being freely attached and detached. The attachment body 23 is supported on the front portions of the booms 10 by a pivot pin 24, thereby being capable of freely turning about a horizontal axis of the pivot pin 24. Not only the bucket 11, other operation tools can be attached to the attachment body 23. The following attachments (spare attachments) are exemplified as the other operation tools; for example, a hydraulic crusher, a hydraulic breaker, an angle broom, an earth auger, a pallet fork, a sweeper, a mower, a snow blower, and the like.

The bucket cylinder 15 is arranged on the front portion of the boom 10. The bucket cylinder 15 is pivotally supported on the boom 10 by a first bucket cylinder pin 26 at an upper portion of the bucket cylinder 15, thereby being capable of freely turning about a horizontal axis of the first bucket cylinder pin 26. The bucket cylinder 15 is pivotally supported on the attachment body 23 by a second bucket cylinder pin 27 at a lower portion of the bucket cylinder 15, thereby being capable of freely turning about a horizontal axis of the second bucket cylinder pin 27. Stretching and shortening of the bucket cylinder 15 swing the bucket 11.

In the embodiment, both of the right travel device 5 and the left travel device 5 employ a wheeled travel device, the wheeled travel device having a front wheel 5F and a rear wheel 5R. However, a crawler travel device (including a semi-crawler travel device) may be employed as the travel device 5.

Next, a concrete configuration of the cabin 3 will be described below.

Figure 1:
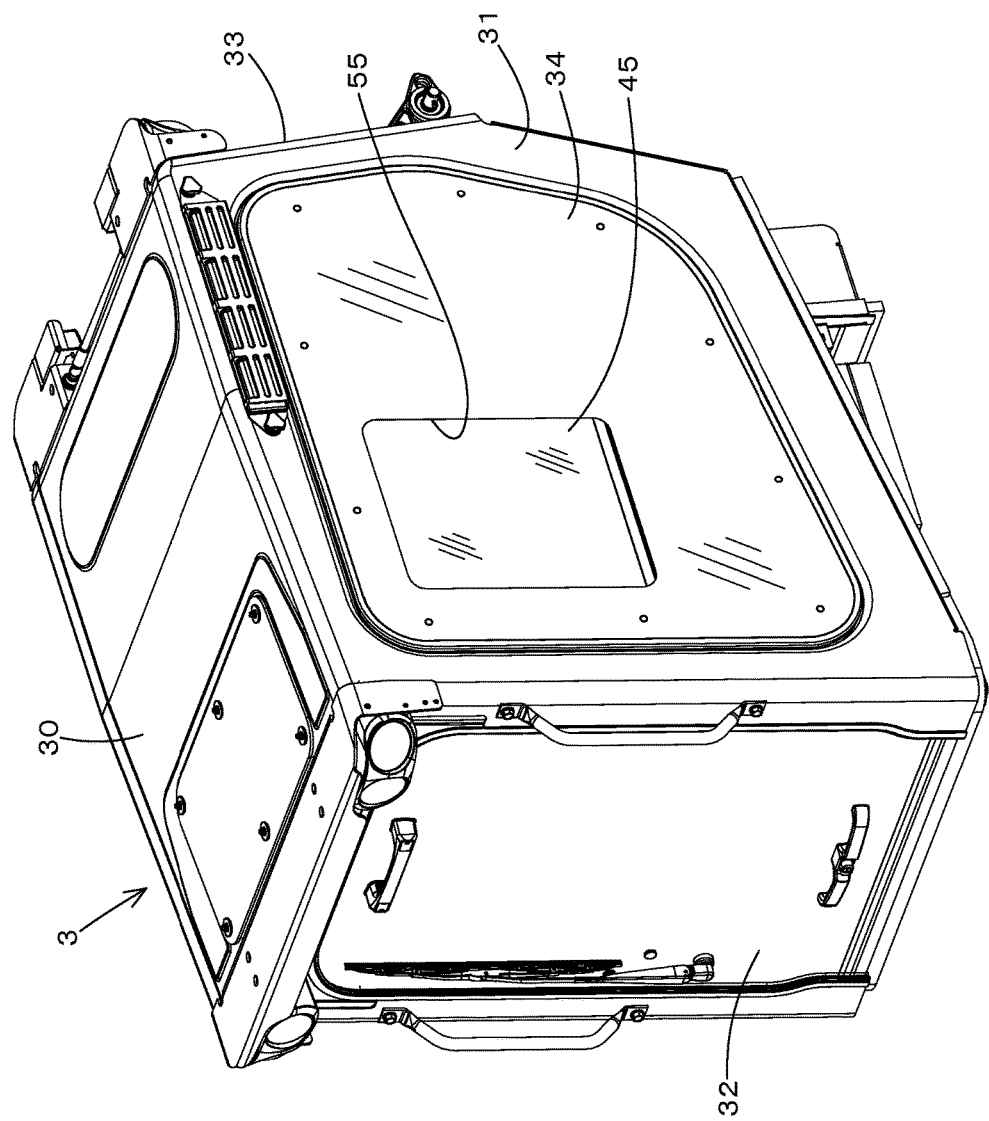
FIG. 1 is a schematic perspective view of a cabin of a working machine according to an embodiment of the present invention.

As shown in FIG. 1 and FIG. 21, the cabin 3 includes an operator seat 8, a roof 30, panels 31, a panel 32, and a panel 33. The roof 30 is arranged above the operator seat 8. The panels 31 are arranged on sides (a right side and a left side) of the operator seat 8 (hereinafter referred to as side panels 31). The panel 32 is arranged in front of the operator seat 8 (hereinafter referred to as a front panel 32). The panel 33 is arranged in back of the operator seat 8 (hereinafter referred to as a rear panel 33). In the explanation described below, a side facing a direction outward the cabin 3 may be referred to as an outer side, that is, a side opposite to the operator seat 8 (a side opposite to the inside of the cabin 3), and a side facing a direction inward the cabin 3 may be referred to as an inner side, that is, a side identical to the operator seat 8 (a side identical to the inside of the cabin 3).

Figure 2:
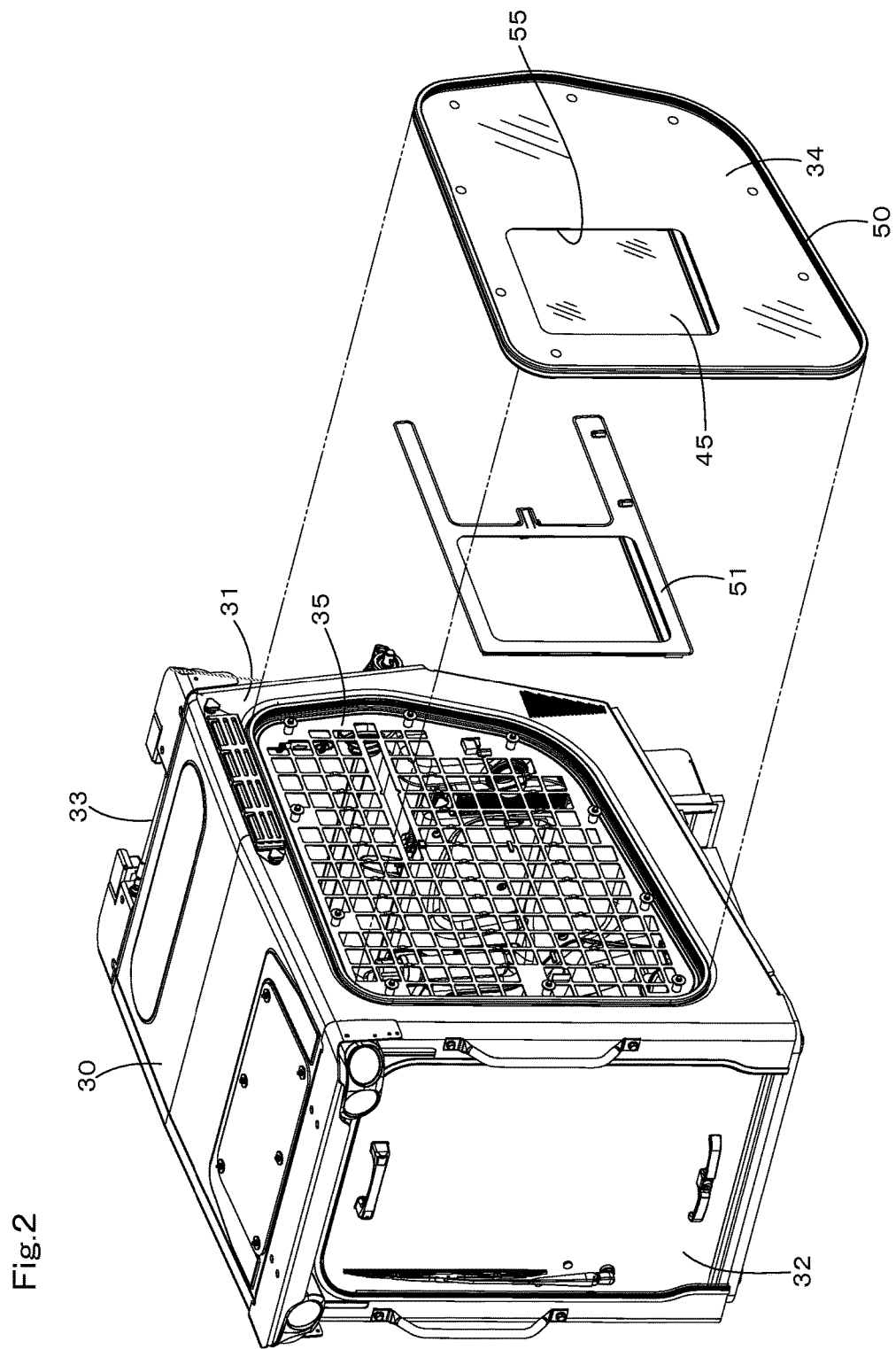
FIG. 2 is an exploded perspective view of the cabin according to the embodiment.
Figure 3:
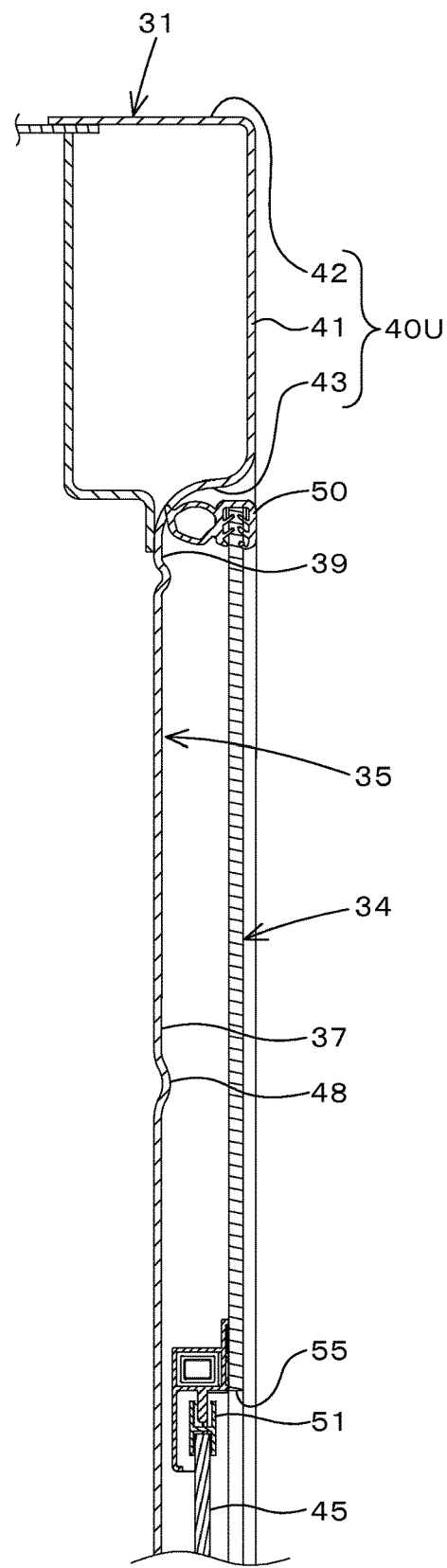
FIG. 3 is a vertical cross-sectional view showing arrangements of a side panel, a glass panel, a window frame, and a window portion (a window panel) of the cabin according to the embodiment.

As shown in FIG. 2 and FIG. 3, a glass panel 34 is disposed on the side opposite to the operator seat 8 (on the outer side) of the side panel 31. In particular, the side panel 31 includes a concave portion 35, the concave portion 35 being concaved toward the side identical to the operator seat 8 (toward the inner side). The glass panel 34 is fitted to the concave portions 35.

Then, concrete configurations of the side panel 31 and the glass panel 34 will be described below.

The side panel 31 will be explained at first.

Figure 4:
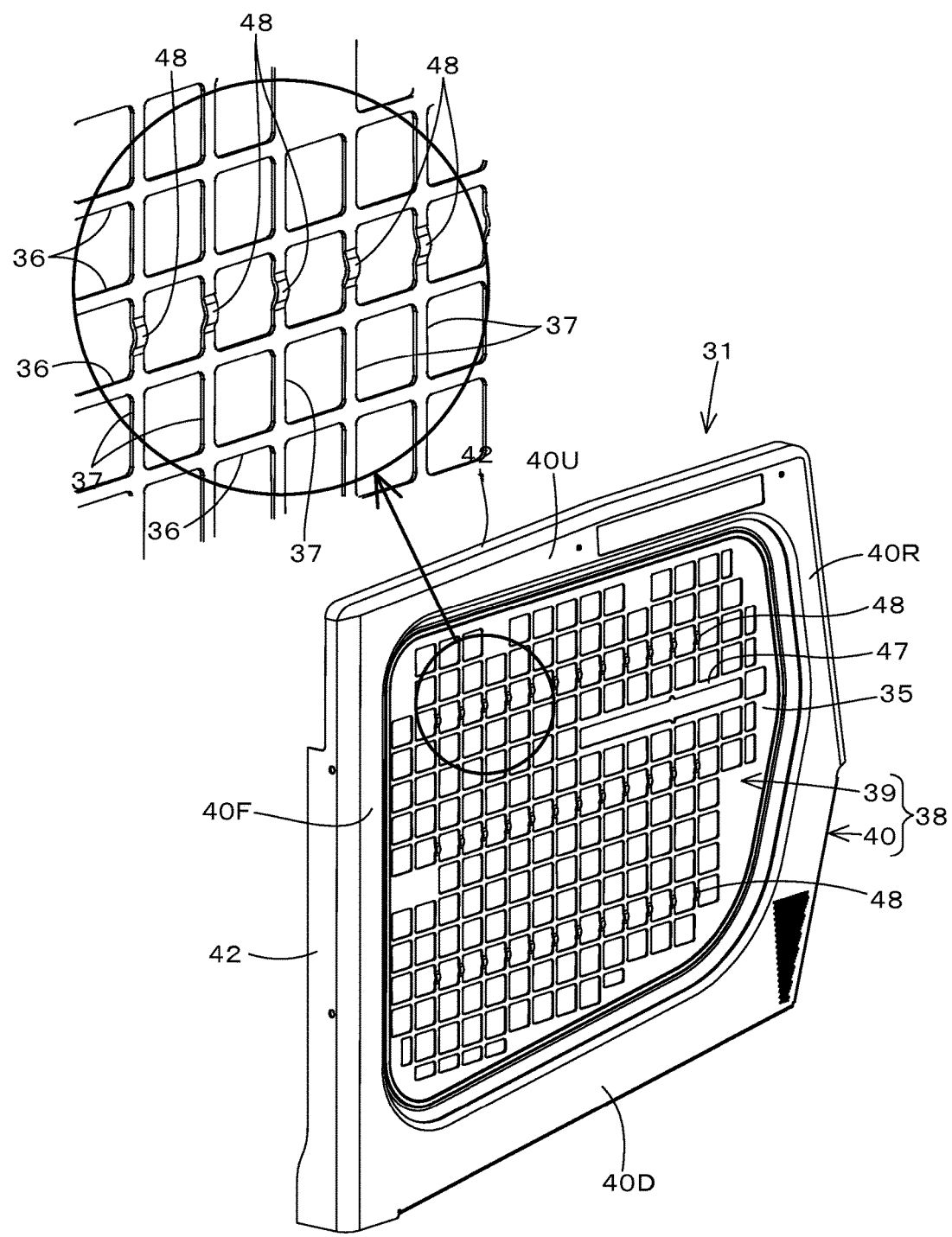
FIG. 4 is a perspective view of an outer side (an outer surface side) of the side panel according to the embodiment.
Figure 5:
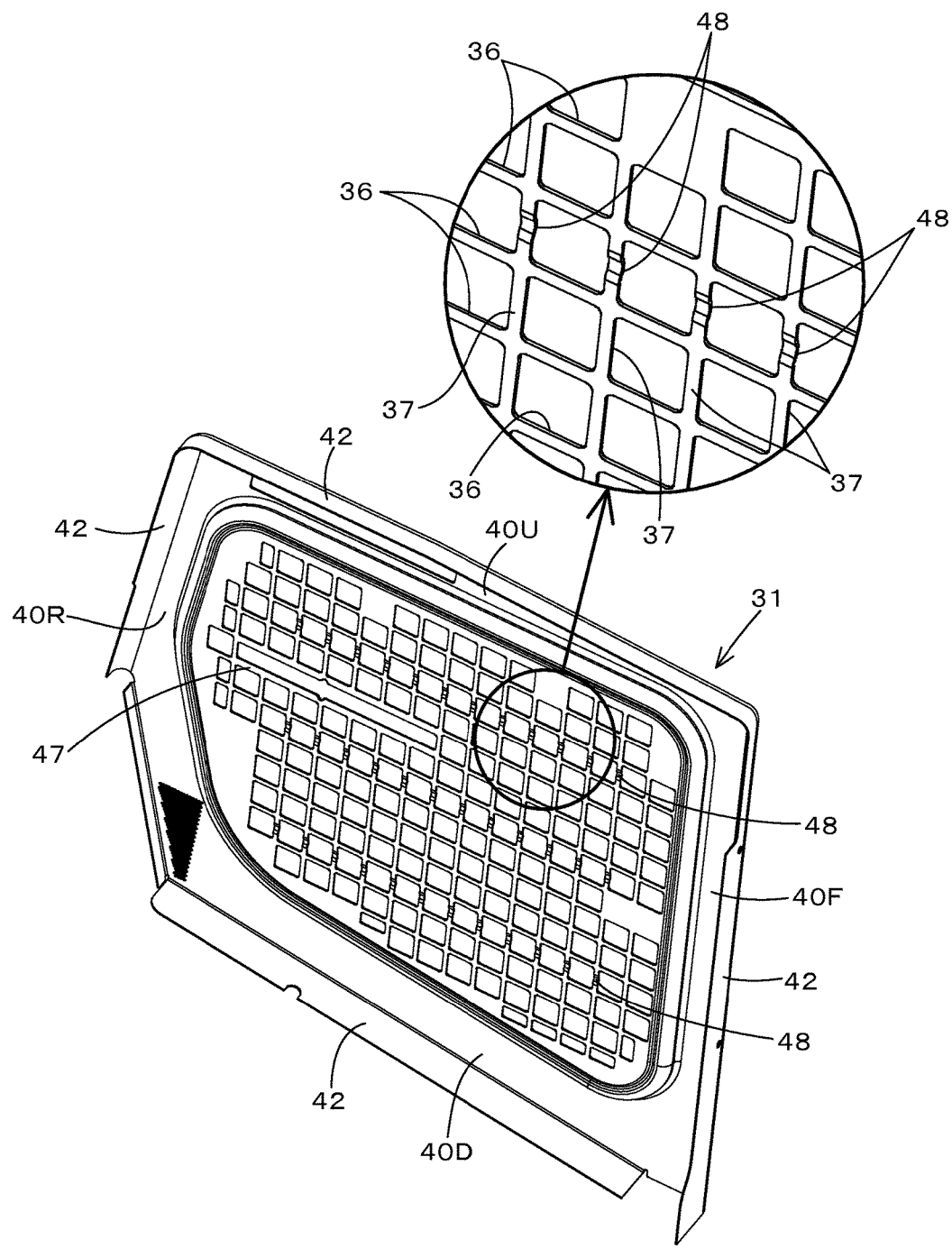
FIG. 5 is a perspective view of an inner side (an inner surface side) of the side panel according to the embodiment.
Figure 6:
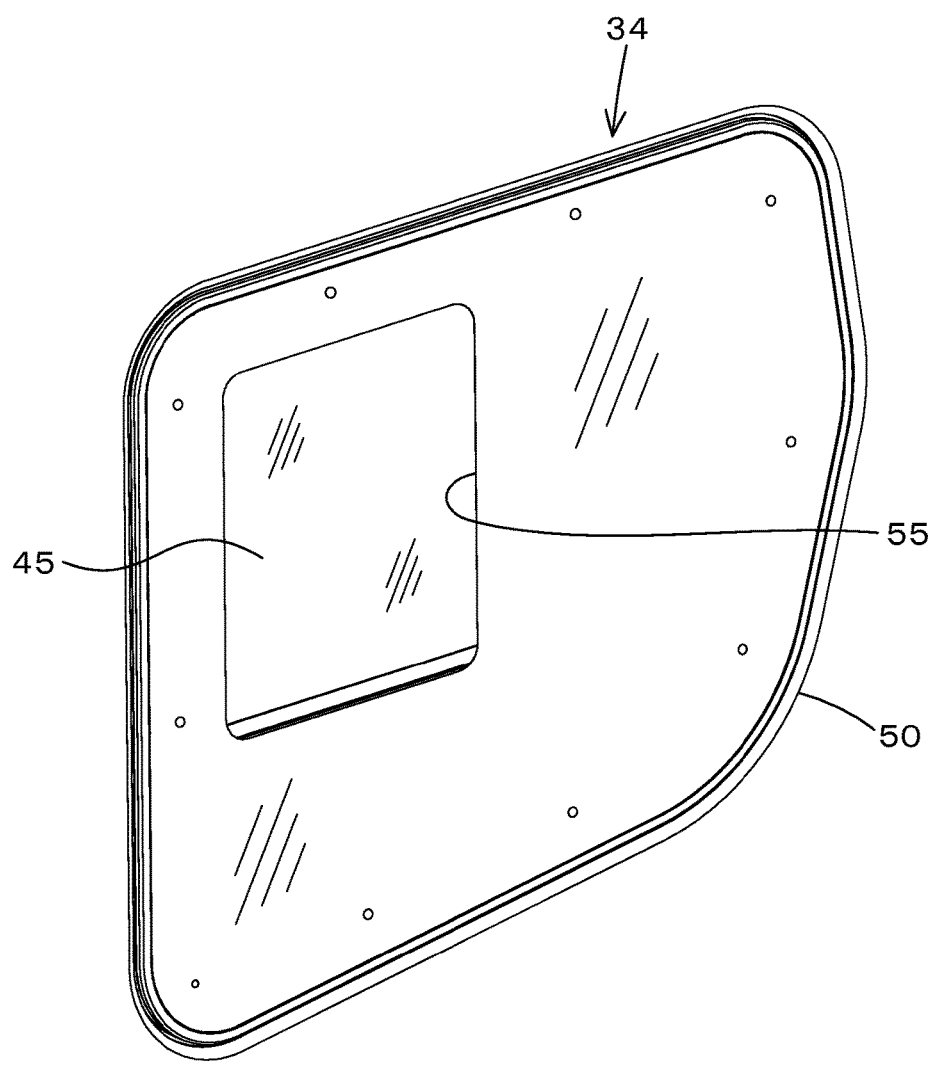
FIG. 6 is a perspective view of an outer side (an outer surface side) of the glass panel according to the embodiment.

As shown FIG. 4 and FIG. 5, the side panel 31 includes a plurality of cross members 36, a plurality of transverse members 37, and a frame member 38.

The plurality of cross members 36 extend along the front to rear direction (or the rear to front direction) and are disposed horizontally at predetermined intervals. Each of the cross members 36 is formed to be a strip and extends horizontally across the frame member 38. In particular, each of the cross members 36 is connected to a front portion of the frame member 38 at a front end of the cross member 36, and is connected to a rear portion of the frame member 38 at a rear end of the cross member 36. The plurality of transverse members 37 extend along a vertical direction and are disposed vertically at predetermined intervals. Each of the transverse members 37 is formed to be a strip and extends vertically across the frame member 38. In particular, each of the transverse members 37 is connected to an upper portion of the frame member 38 at an upper end of the transverse member 37, and is connected to a lower portion of the frame member 38 at a lower end of the transverse member 37. The plurality of cross members 36 intersect with the plurality of transverse members 37 each other, thereby forming a grille with many openings, the openings being also referred to as grille openings.

The plurality of cross members 36 are disposed horizontally at predetermined intervals, and the plurality of transverse members 37 are disposed vertically at predetermined intervals. The interval between the cross members 36 adjacent to each other is, for example, equal to the interval between the transverse members 37 adjacent to each other. In addition, the cross members 36 are perpendicular to the transverse members 37, thereby forming a grille with many square openings. Meanwhile, in the embodiment of the present invention, the interval between the cross members 36 adjacent to each other may be different from the interval between the transverse members 37 adjacent to each other. An angle of intersection between the cross member 36 and the transverse member 37 is not limited only to the example shown in the drawings.

The frame member 38 is disposed around the plurality of cross members 36 and the plurality of transverse members 37 to enclose the cross members 36 and the transverse members 37. That is, the frame member 38 connects between end portions of the cross members 36 and between end portions of the transverse members 37. In particular, the frame member 38 includes an inner peripheral portion 39 and an outer peripheral portion 40. The inner peripheral portion 39 includes a front portion, a rear portion, an upper portion, and a lower portion, and has a rectangular shape when seen from the inner side or the outer side. The front ends of the cross members 36 are connected to the front portion of the inner peripheral portion 39. The rear ends of the cross members 36 are connected to the rear portion of the inner peripheral portion 39. The upper ends of the transverse members 37 are connected to the upper portion of the inner peripheral portion 39. The lower ends of the transverse members 37 are connected to the lower portion of the inner peripheral portion 39.

The outer peripheral portion 40 has a rectangular shape when seen from the inner side or the outer side, and is disposed around the inner peripheral portion 39 to enclose the inner peripheral portion 39. The outer peripheral portion 40 includes a front plate portion 40F, a rear plate portion 40R, an upper plate portion 40U, and lower plate portion 40D. The front plate portion 40F is positioned in front of the inner peripheral portion 39. The rear plate portion 40R is positioned in back of the inner peripheral portion 39. The upper plate portion 40U is positioned above the inner peripheral portion 39. The lower plate portion 40D is positioned under the inner peripheral portion 39. The front plate portion 40F is positioned apart from the rear plate portion 40R. The upper plate portion 40U joints between an upper portion of the front plate portion 40F and an upper portion of the rear plate portion 40R with each other. The lower plate portion 40D joints between a lower portion of the front plate portion 40F and a lower portion of the rear plate portion 40R with each other.

The front plate portion 40F, the rear plate portion 40R, the upper plate portion 40U, and the lower plate portion 40D each include an outer rim portion 42. The outer rim portion 42 is constituted of protrusions projecting toward the operator seat 8 (toward the inner side) from each of the front plate portion 40F, the rear plate portion 40R, the upper plate portion 40U, and the lower plate portion 40D. In addition, the front plate portion 40F, the rear plate portion 40R, the upper plate portion 40U, and the lower plate portion 40D each include an inner rim portion 43. The inner rim portion 43 is constituted of protrusions projecting toward the operator seat 8 (toward the inner side) from each of the front plate portion 40F, the rear plate portion 40R, the upper plate portion 40U, and the lower plate portion 40D. End portion (on an inner side) of the inner rim portion 43 reaches the inner peripheral portion 39, and thus the inner rim portion 43 and the inner peripheral portion 39 form the concave portion 35.

Figure 7:
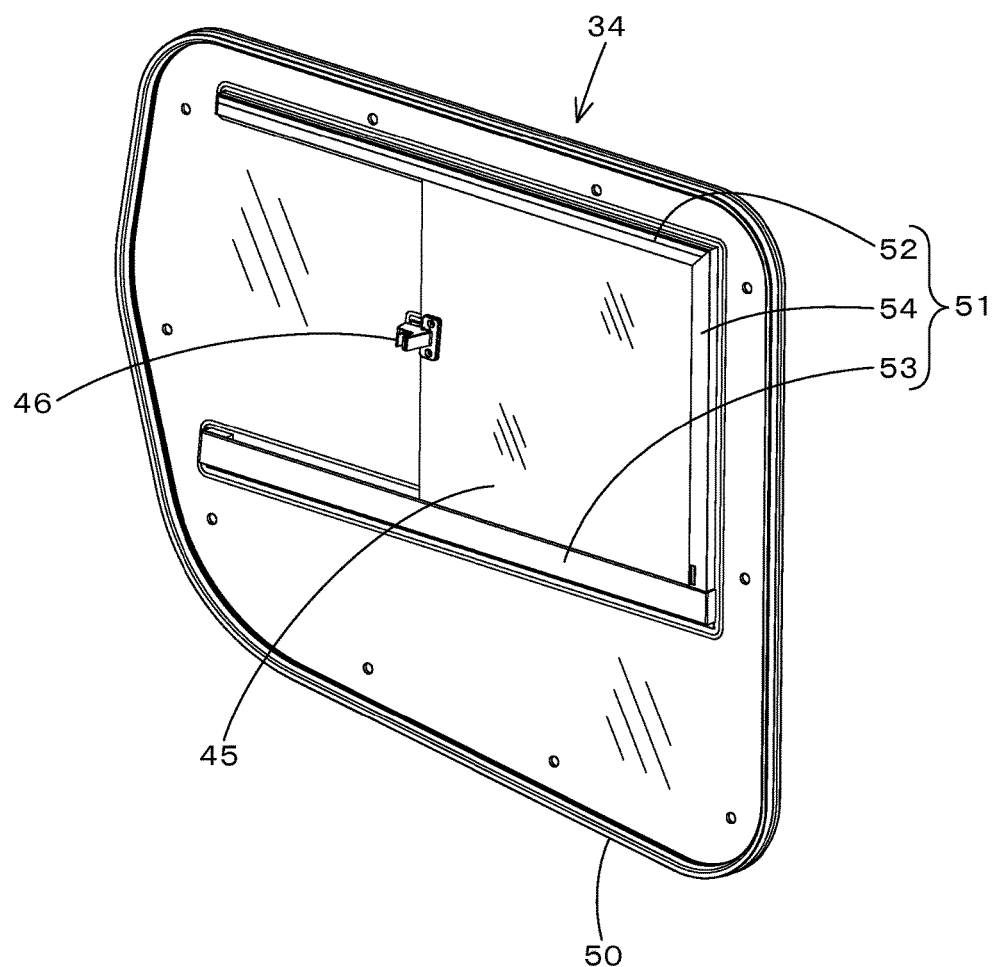
FIG. 7 is a perspective view of an inner side (an inner surface side) of the glass panel according to the embodiment.

As shown in FIG. 7, the grille includes a guide portion (a guide frame) 47, the grille being formed in the side panel 31. The glass panel 34 includes a window panel 45 having a projecting member 46. The guide portion 47 guides movement of the projecting member 46 of the window panel 45 disposed on the glass panel 34. In particular, the guide portion 47 enables the window panel 45 to move forward and backward together with the projecting member 46, and provides a function to limit (restrict) a moving distance of the window panel 45. Detailed configurations of the glass panel 34 will be described below.

The guide portion 47 is formed of a portion surrounded by: two transverse members 37 not adjacent to each other; and two cross members 36 adjacent to each other. The cross members 36 adjacent to each other are positioned apart from each other only at a distance corresponding to one grille opening. On the other hand, the transverse members 37 not adjacent to each other are positioned apart from each other at a distance corresponding to a plurality of the grille openings (seven grille openings in the drawings).

The projecting member 46 contacts and slides on the cross members 36 of the guide portion 47 when the window panel 45 is being opened and closed. For this reason, it is preferred to make the cross members 36 be thicker in a portion contacting the projecting member 46 than in the rest portion not contacting the projecting member 46 as shown in FIG. 4 and FIG. 5. In addition, the projecting member 46 contacts the transverse members 37 of the guide portion 47 when the window panel 45 is being opened and closed. For this reason, it is preferred to make the transverse members 37 be thicker in a portion contacting the projecting member 46 than in the rest portion not contacting the projecting member 46, not shown in the drawings.

The guide portion 47 is disposed on a position corresponding to a rear portion of the side panel 31, and forms a long opening that is elongated along the front to rear direction (or the rear to front direction) and has a rectangular shape. The guide portion 47 can be formed, for example, by cutting off some of the transverse members 37 adjacent along the front to rear direction (or the rear to front direction), from among the plurality of transverse members 37 and the plurality of cross members 36 each constituting the grille, only by a length (a height) of the grille opening (hereinafter referred to as a unit length (or a unit height)).

The side panel 31 has a reinforcement member, the reinforcement member being a portion reinforced to increase stiffness of the side panel 31. The reinforcement member includes a first reinforcement portion 48.

The first reinforcement portion 48 is formed in the transverse member 37. For details, as shown in FIG. 3 to FIG. 5, the first reinforcement portion 48 is formed by deforming the transverse member 37 to be partially projected toward the side opposite to the operator seat 8 (toward the outer side). For further details, the first reinforcement portion 48 is formed by deforming a portion of the transverse member 37 to be projected, the portion being between the cross members 36 adjacent to each other. The projection of the first reinforcement portion 48 has a V-shape in the example shown in the drawings, and may have a U-shape or a W-shape. The first reinforcement portion 48 may be formed in all the transverse members 37 in the unit lengths identical to each other (or the unit heights identical to each other), and may be formed in some of the transverse members 37. For example, the first reinforcement portion 48 may be formed in portions of the plurality of transverse members 37, the portions being between the second cross member 36 from the upper portion and the third cross members 36. For another example, the first reinforcement portion 48 may be formed in portions of the plurality of transverse members 37, the portions being between the forth cross member 36 from the upper portion and the fifth cross members 36. That is, the first reinforcement portion 48 may be formed in portions of the plurality of transverse members 37, the portions being between the i-th cross member 36 from the upper portion and the (i+1)-th cross members 36. Meanwhile, the symbol [i] means the number of the cross members 36, and the symbol [i] is natural number, that is, 1, 2, 3, and so on.

In the above-mentioned description, the first reinforcement portion 48 is disposed on the transverse member 37 in the example shown in the drawings. However, the first reinforcement portion 48 may be disposed on the cross members 36 and on both of the transverse members 37 and the cross members 36.

The side panel 31 includes the first reinforcement portion 48 described above. Thus, the first reinforcement portion 48 provides a function to suppress deformation of the cross members 36 or the transverse members 37 each forming the grille. In this manner, the stiffness of the side panel 31 is improved, and the side panel 31 can be prevented from deforming accordingly.

The side panel 31 having the above-mentioned configurations can be manufactured by processing a metal plate.

The manufacturing of the side panel 31 includes a first process, a second process, and a third process. The first process prepares a metal plate, and forms openings in the prepared metal plate (a flat plate) through a process for forming openings, thereby forming the grille. That is, the first process forms the grille in the metal plate.

A laser processing, a punch press processing, and other processing methods may be employed as the process for forming the openings.

The second process presses the plate having the grille, using a press forming process, to form the first reinforcement portion 48. The third process presses the plate, using the press forming process, to form the concave portion 35 and the outer rim portion 42, the plate already having the grille and the first reinforcement portion 48.

The side panel 31 is finished by other necessary process as needed after the above-mentioned first process to second process.

The above-mentioned manufacturing method is different from a conventional method for manufacturing a side panel. The conventional method firstly deforms a plate through a press forming process, and then performs a process for forming openings in the pressed plate, thereby forming a grille. In addition, another conventional method, that is also a conventional method for manufacturing a side panel, firstly forms openings in a flat panel to form a grille, and then integrally assembles the flat panel having the grille on a frame deformed by a press forming process, using a welding process or a bolt fastening process. However, the former conventional method has to perform the laser processing more than once using a three-dimensional laser because the process for forming openings is performed on the deformed plate, and the latter conventional method has to perform the welding process or the bolt fastening process in addition to the process for forming openings and the press forming process. Both of the conventional methods require many processes accordingly. A possible method firstly forms openings in a flat plate to form a grille plate, and then presses the grille plate to form a concave portion and a frame portion at the same time. The method can be considered as a method for reducing the number of processes. However, when the grille plate is pressed to be deformed, the grille plate will be cracked and undulate because of the low stiffness of the grille plate.

On the contrary, the method according to the embodiment of the present invention firstly forms openings in a flat plate to form a grille, and then forms the first reinforcement portion 48 on the flat plate having the grille, using the press forming process. Then, the method is capable of manufacturing the side panel 31 by only performing the press forming process on the plate having the grille and the first reinforcement portions 48.

In addition, the side panel 31 is provided with the improved high stiffness due to the first reinforcement portion 48 formed by using the press forming process, thereby being hard to be deformed. Thus, the side panel 31 is prevented from being cracked and undulating.

The cabin 3 can be manufactured by assembling the roof 30, the front panel 32, the rear panel 33, the glass panel 34, the operator seat 8, and the like with the side panel 31 manufactured in the above-mentioned manner.

Then, a concrete configuration of the glass panel 34 will be described below.

As shown in FIG. 1 to FIG. 3, FIG. 5, and FIG. 6, the glass panel 34 is secured by a frame 50 at a circumferential portion of the glass panel 34, and is fitted to the concave portion 35 of the side panel 31 together with the frame 50.

A window frame 51 is disposed on the side (the inner side) of the glass panel 34, the inner side being an identical side to the operator seat 8 (the side identical to the inside of the cabin 3).

As shown in FIG. 7, the window frame 51 includes an upper frame portion 52, a lower frame portion 53, and a front frame portion 54. The upper frame portion 52 is extended along the front to rear direction (or the rear to front direction) at a position near the upper rim portion of the frame 50. The lower frame portion 53 is extended along the front to rear direction (or the rear to front direction) at an approximately intermediate position between the upper rim portion and the lower rim portion of the frame 50. The front frame portion 54 is vertically extended to connect between a front end portion of the upper frame portion 52 and a front end portion of the lower frame portion 53.

The window panel 45 is formed of a glass plate. The window panel 45 is fitted to the window frame 51. The window panel 45 is capable of moving (sliding) forward and backward along the upper frame portion 52 and the lower frame portion 53 of the window frame 51.

The glass panel 34 includes a circular rim 55 in a front portion of the window frame 51, the rim 55 forming an opening. The window panel 45 moves (slides) forward within the window frame 51, thereby closing the opening formed by the rim 55, and moves (slides) backward within the window frame 51, thereby releasing the opening.

Figure 8:
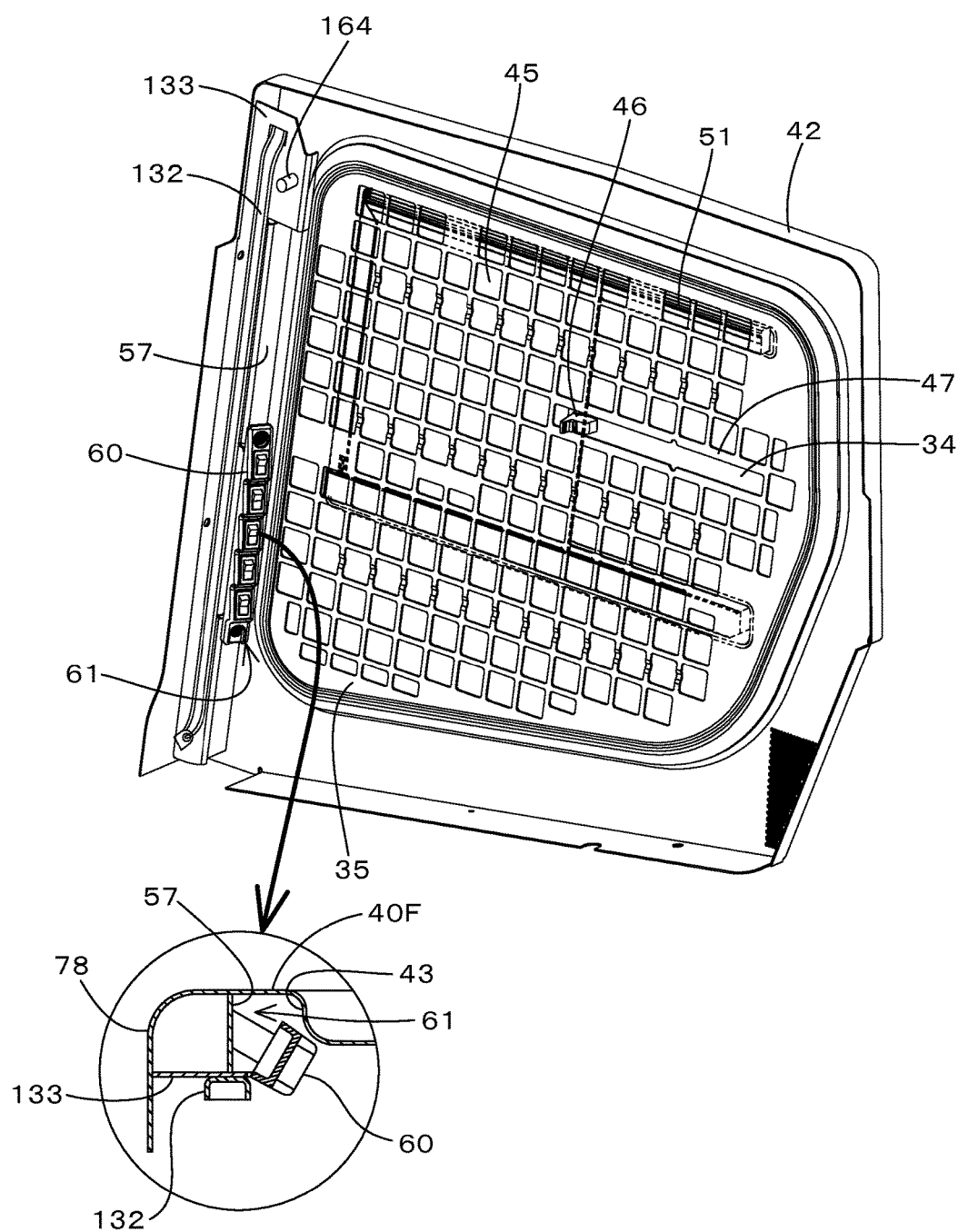
FIG. 8 is a view showing the inner side (the inner surface side) of the side panel where the window portion (the window panel) according to the embodiment is closed.
Figure 9:
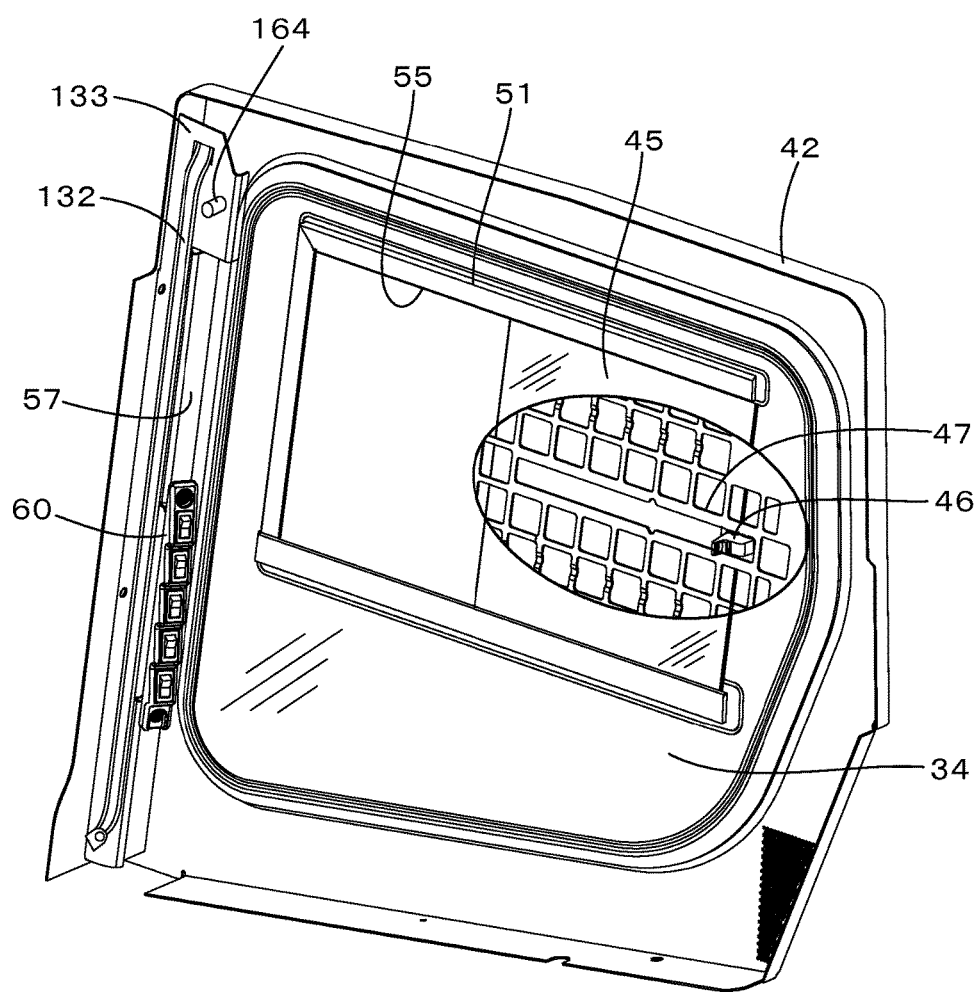
FIG. 9 is a view showing the inner side (the inner surface side) of the side panel where the window portion (the window panel) according to the embodiment is opened.

As shown in FIG. 7 to FIG. 9, the window panel 45 is provided with the projecting member 46. The projecting member 46 is disposed on the side (the inner side) of the window panel 45, the inner side being an identical side to the operator seat 8 (the side identical to the inside of the cabin 3), that is, on the window panel 45. The projecting member 46 is inserted to the guide portion 47 and is capable of moving (sliding) between a front end and a rear end of the guide portion 47 in accordance with the forward and backward moving (sliding) of the window panel 45.

As described above, the projecting member 46 is disposed on a rear portion of the window panel 45, the projecting member 46 being inserted to the guide portion 47. The guide portion 47 is disposed on a rear portion of the side panel 31. In addition, the opening formed by the rim 55 is disposed on a front portion of the window frame 51. As shown in FIG. 9, even when the window panel 45 is moved (slid) backward to release the opening, the guide portion 47 is not communicated with an outside of the cabin 3 through the opening. That is, even when the window panel 45 is moved (slid) backward to release the opening, the guide portion 47 can be separated from the outside of the cabin 3 by a portion (a rear portion) of the glass panel 34, the rear portion not having the opening of the glass panel 34. In other words, a position of the rim 55 forming the opening does not correspond to a position of the guide portion 47, and is different from the position of the guide portion 47 in the front to rear direction (or the rear to front direction). The rim 55 is opposite to the grille of the side panel 31, that is, the rim 55 faces a portion forming the grille.

As described above, the inside of the cabin 3 is communicated with the outside of the cabin 3 when the opening is released. However, the grille of the side panel 31 is capable of protecting the side of the operator seat 8 regardless of the communication. In addition, since the glass panel 34 is arranged on an outside of the side panel 31 (the side opposite to the operator seat 8), the glass panel 34 can be easily attached, detached, and cleaned from the outside of the cabin 3. In other words, the grille of the side panel 31 does not interfere the attachment, the detachment, and the cleaning of the glass panel 34. FIG. 9 shows a portion of the grille, the portion being surrounded by an oval, by excluding the rest portion of the grille (the outside of the oval), thereby clearly showing the window panel 45, the window frame 51, and the rim 55.

Figure 11:
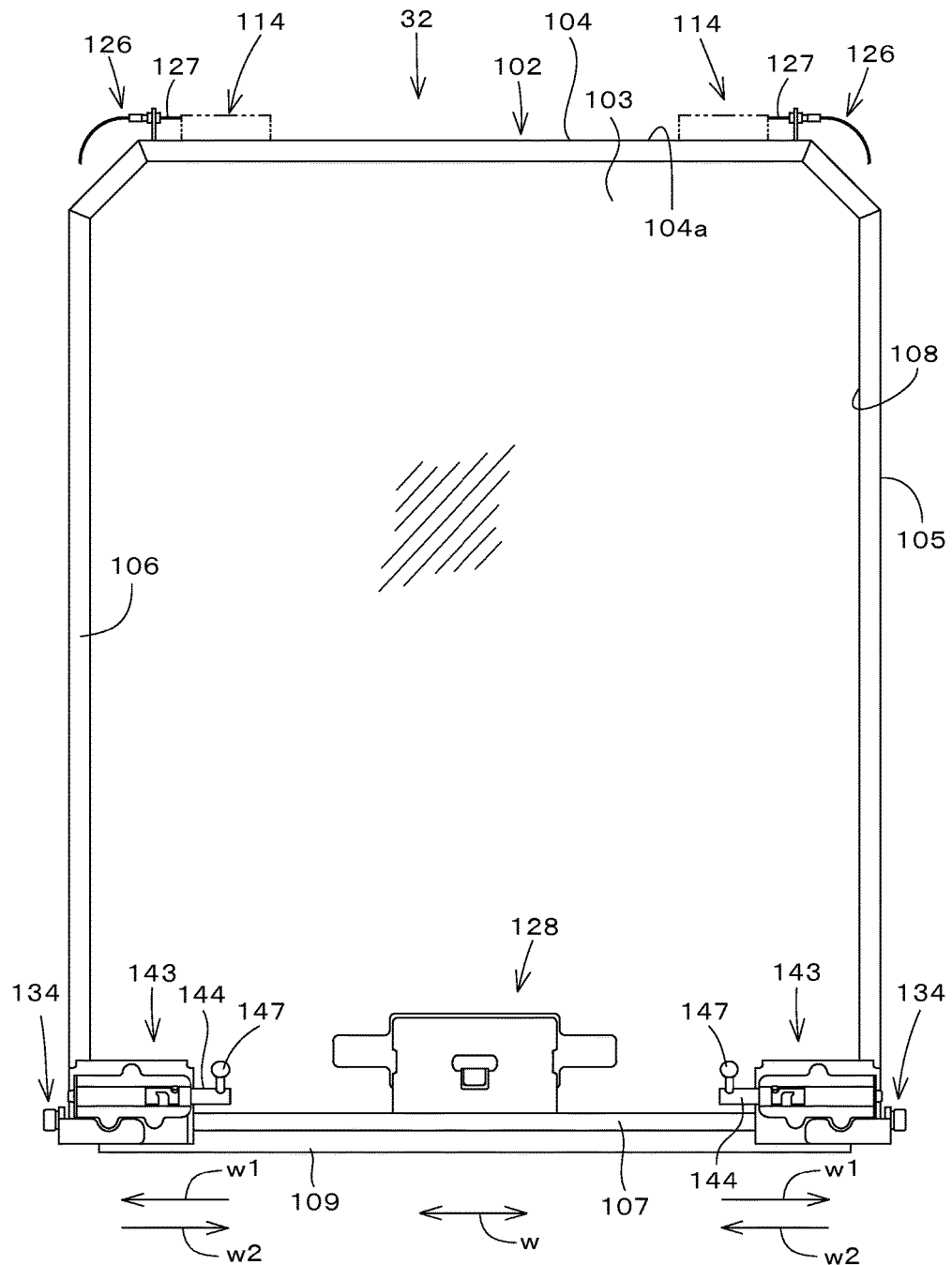
FIG. 11 is a back view of a front panel of the cabin according to the embodiment.

FIG. 11 shows a back surface of the front panel 32. As shown in FIG. 11, the front panel 32 includes a panel frame 102 and a panel plate 103.

The panel frame 102 includes an upper frame portion 104, a right frame portion 105, a left frame portion 106, and a lower frame portion 107. The panel frame 102 is formed to be a substantially-quadrangular frame. The upper frame portion 104 is arranged on an upper side of the panel frame 102. The right frame portion 105 is arranged on a right side of the panel frame 102. The left frame portion 106 is arranged on a left side of the panel frame 102. The lower frame portion 107 is arranged on a lower side of the panel frame 102. An opening 108 is surrounded by and formed of the upper frame portion 104, the right frame portion 105, the left frame portion 106, and the lower frame portion 107. A seal member 109 is firmly fixed on a lower surface of the lower frame portion 107.

The panel plate 103 is constituted of a transparent glass plate. The panel plate 103 is fixed on a front surface of the panel frame 102 and closes the opening 108 of the panel frame 102.

Figure 10:
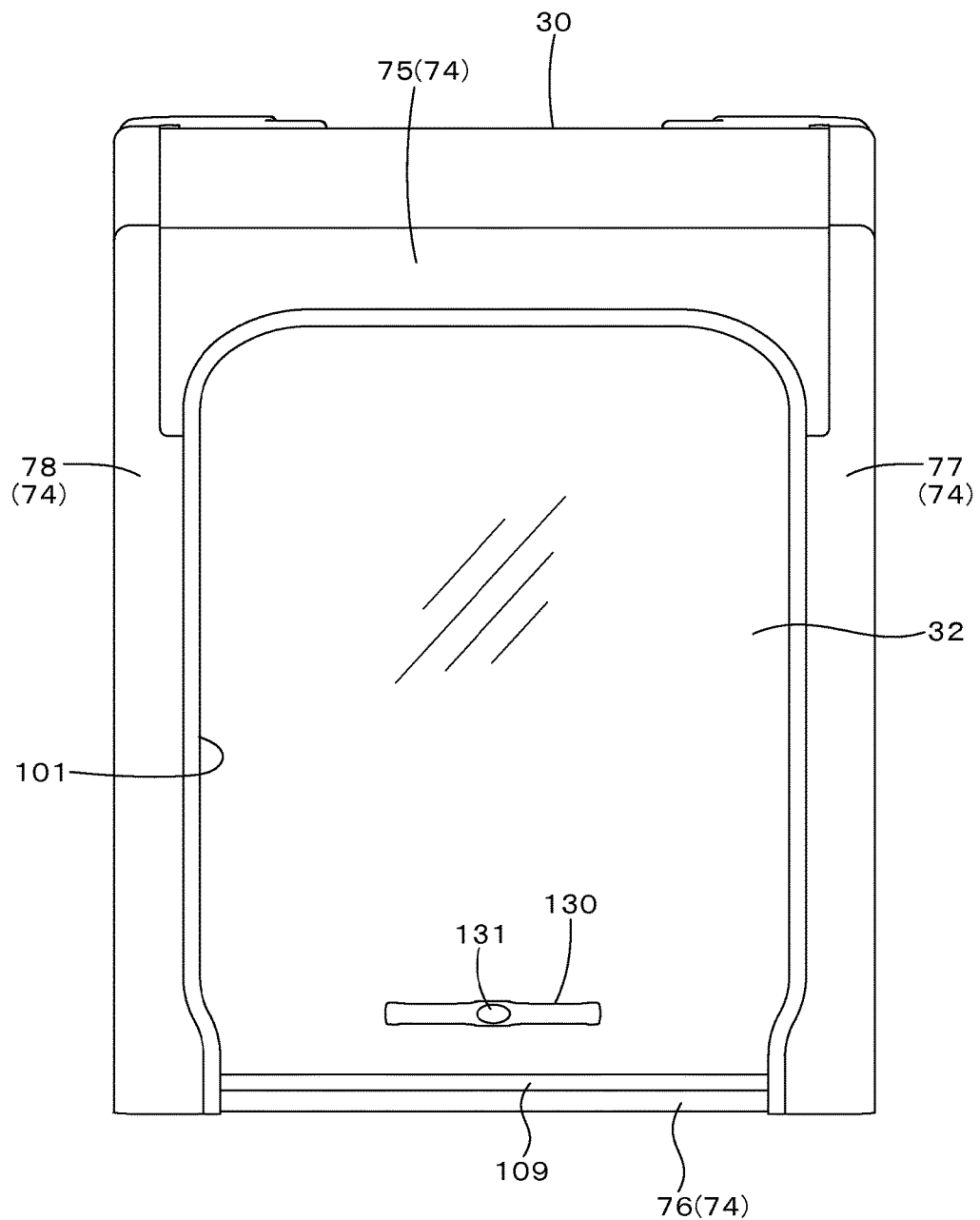
FIG. 10 is a front view of the cabin according to the embodiment.
Figure 12:
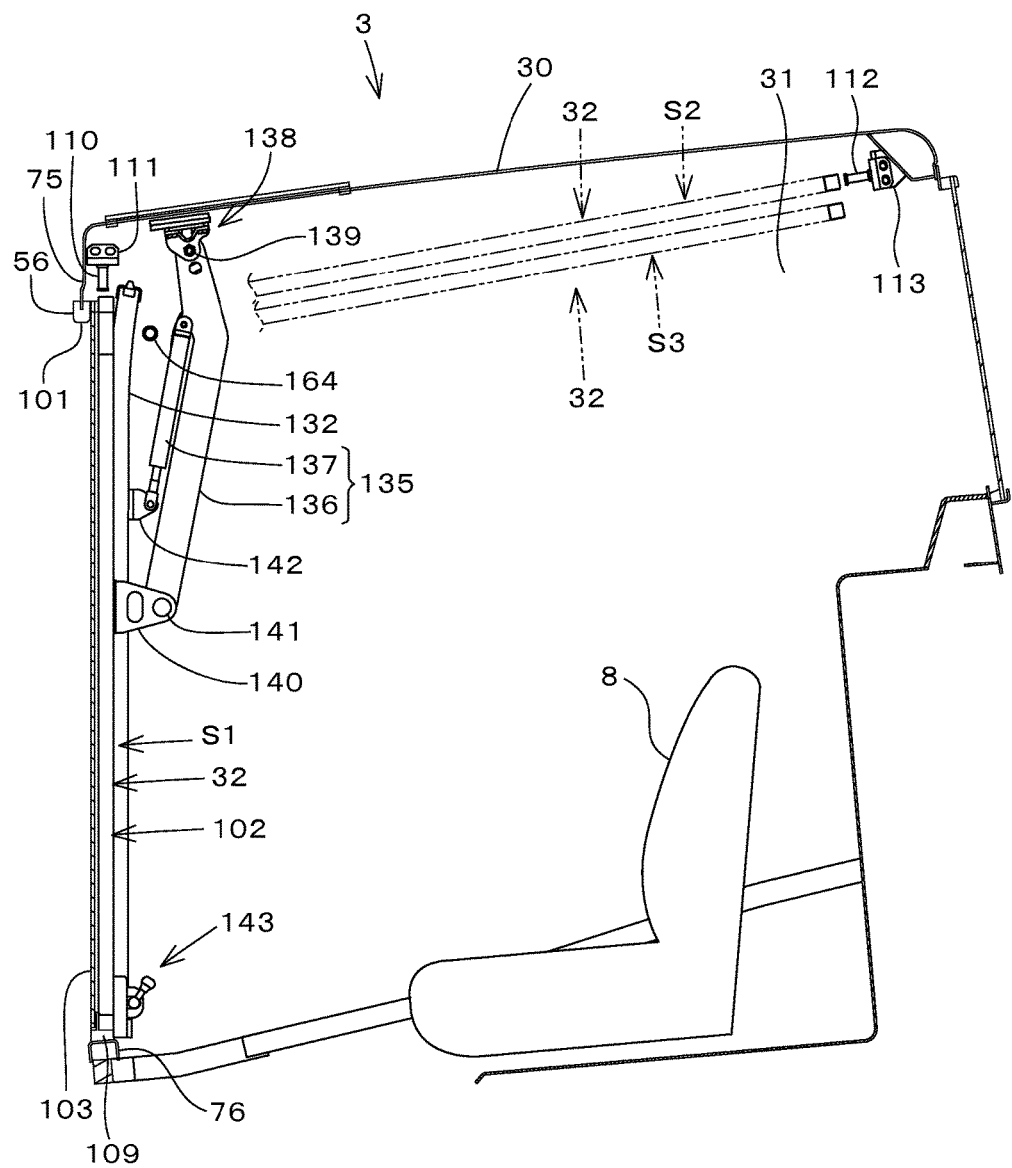
FIG. 12 is a side cross-sectional view of the cabin according to the embodiment.

As shown in FIG. 10 and FIG. 12, the cabin 3 includes a frame member 74, the frame member 74 (hereinafter referred to as the entrance frame 74) forming an opening 101 for getting on and off (hereinafter referred to as an entrance opening 101). The entrance frame 74 includes an upper frame portion 75, a lower frame portion 76, a left frame portion 77, and a right frame portion 78. The upper frame portion 75 extends downward from a front end portion of the roof 30 and is positioned on or above an upper portion of the front panel 32. The lower frame portion 76 is opposite to the upper frame portion 75 and is positioned on or under a lower portion of the front panel 32. The left frame portion 77 is positioned on or beside a left portion of the front panel 32, the left portion being the outer rim portion 42 disposed on a front side of the left side panel 31. The right frame portion 78 is positioned on or beside a right portion of the front panel 32, the right portion being the outer rim portion 42 disposed on a front side of the right side panel 31. The upper frame portion 75, the lower frame portion 76, the left frame portion 77, and the right frame portion 78 are provided with a seal member 56 or the seal member 109.

The front panel 32 is in contact with the seal member 56 from behind (from an inside of the cabin 3), thereby closing the entrance opening 101.

As shown in FIG. 12, the front panel 32 is capable of being moved to a closing position S1 (a first position) where the front panel 32 closes the entrance opening 101 as shown by a solid line in FIG. 12 and to a housing position S2 (a second position) where the front panel 32 is housed between the operator seat 8 and the roof 30 as shown by a two-dot chain line in FIG. 12, and thus the front panel 32 is capable of being freely moved between the closing position S1 and the housing position S2. The entrance opening 101 is opened when the front panel 32 is moved to the housing position S2.

In addition, a pair of strikers (first strikers) 110 are disposed on a back surface of the upper frame portion 75 of the entrance frame 74 (on a surface facing the inside of the cabin 3) as shown in FIG. 12. One of the first strikers 110 is disposed on a left side of the back surface, and the other one of the first strikers 110 is disposed on a right side of the back surface. Each of the first strikers 110 is fixed to corresponding one of brackets 111, the brackets 111 being disposed on the upper frame portion 75 of the entrance frame 74. Each of the first strikers 110 project downward from the corresponding bracket 111.

In addition, a pair of strikers (second strikers) 112 are disposed on a rear portion of the roof 30, that is, behind the operator seat 8 and under the roof 30. One of the second strikers 112 is disposed on a left side of the rear portion of the roof 30, and the other one of the second strikers 112 is disposed on a right side of the rear portion of the roof 30. Each of the second strikers 112 is fixed to corresponding one of brackets 113, the brackets 113 being disposed on a side closer to a lower surface of the roof 30.

A pair of latches 114 are disposed on an upper surface 104a of the upper frame portion 104 of the front panel 32, that is, on a rim laying under the first strikers 110 when the front panel 32 is moved to the first position S1 (portions corresponding to the first strikers 110 when the front panel 32 is moved to the first position S1). One of the latches 114 is disposed on a left side of the upper surface 104a, and the other one of the latches 114 is disposed on a right side of the upper surface 104a. Each of the latches 114 is capable of being engaged to the corresponding strikers 110 and 112.

Each of the latches 114 is capable of being engaged to the corresponding first striker 110 under a state where the front panel 32 is moved to the closing position S1. And, each of the latches 114 is capable of being engaged to the corresponding second striker 112 under a state where the front panel 32 is moved to the housing position S2.

In addition, the latch 114 disposed on the right side is capable of being engaged to the strikers 110 and 112 disposed on the right side, and the latch 114 disposed on the left side is capable of being engaged to the strikers 110 and 112 disposed on the left side. In addition, the front panel 32 is held at the closing position S1 when the latch 114 is engaged to the first striker 110, and the front panel 32 is held at the housing position S2 when the latch 114 is engaged to the second striker 112. The front panel 32 becomes repositionable (becomes capable of being freely moved) when the engagement between the latch 114 and the striker 11Q or 112 is released.

Meanwhile, at least one grip or finger grip (not shown in the drawings) is disposed on an inner side of the front panel 32 (inside the cabin 3), the grip or the finger grip being grasped or pinched for the move (reposition) of the front panel 32.

Figure 13:
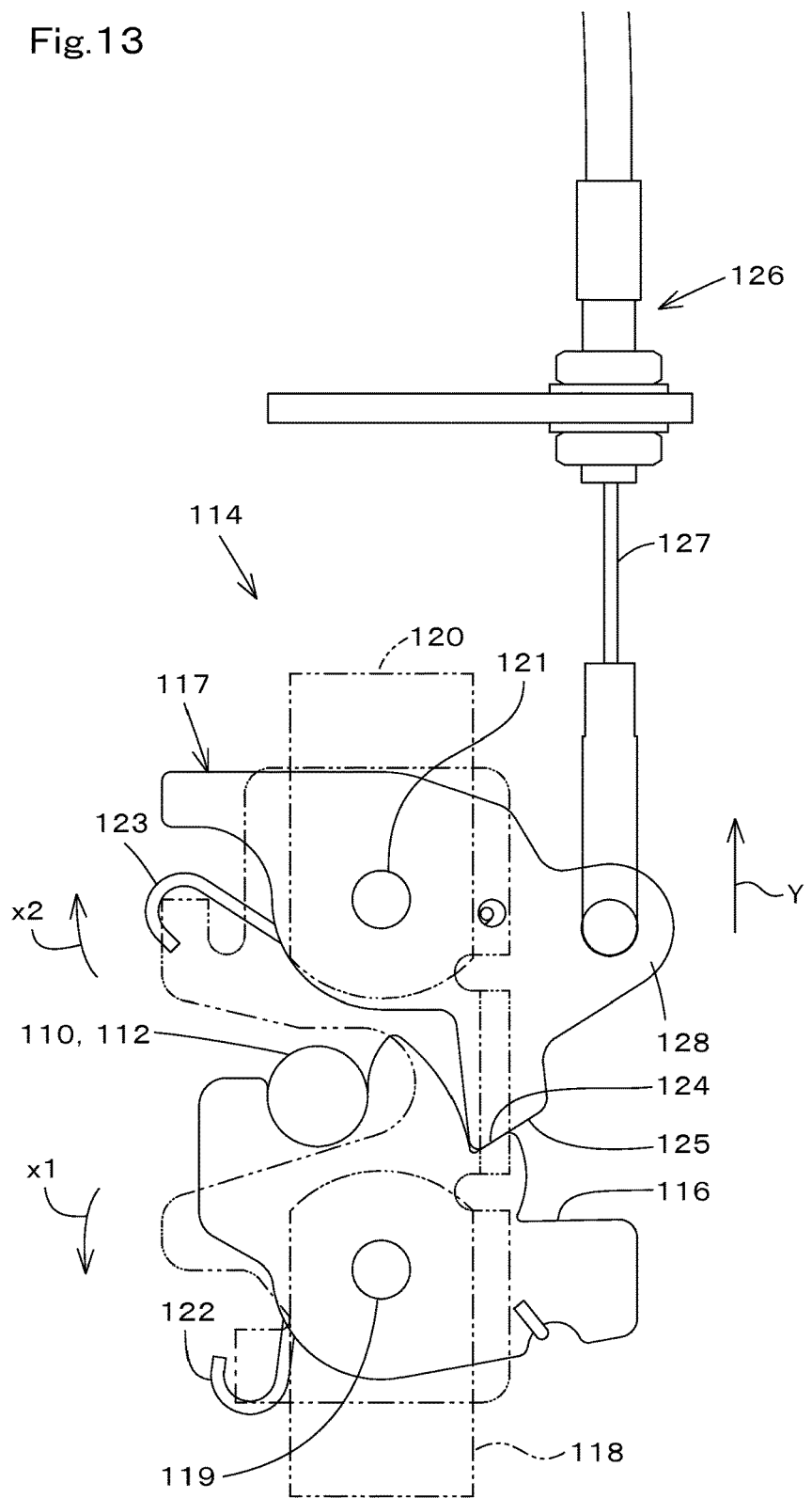
FIG. 13 is a plan view of a latch of the front panel according to the embodiment.

As shown in FIG. 13, the latch 114 includes an engagement plate 116 and a lock plate 117. The engagement plate 116 is engaged to the strikers 110 and 112. The lock plate 117 holds the engagement between the engagement plate 116 and the strikers 110 and 112. FIG. 13 shows the latch 114 disposed on the right side of the front panel 32.

The engagement plate 116 is supported on a first bracket 118 by a first pivot shaft 119 to be capable of freely turning, the first bracket 118 being fixed to the upper frame portion 104 of the panel frame 102. The lock plate 117 is supported on a second bracket 120 by a second pivot shaft 121 to be capable of freely turning, the second bracket 120 being fixed to the upper frame portion 104 of the panel frame 102.

The engagement plate 116 is pressed by a spring 122 toward a direction shown by an arrowed line X1, the spring 122 being formed of a twisted coil spring. The lock plate 117 is pressed by a spring 123 toward a direction shown by an arrowed line X2, the spring 123 being formed of a twisted coil spring. The engagement plate 116 is provided with an engagement concave portion 124. An engagement portion 125 is formed in the lock plate 117, the engagement portion 125 being configured to engage to the engagement concave portion 124.

The turn of the engagement plate 116 is restricted in the direction shown by the arrowed line X1 when the engagement portion 125 is engaged to the engagement concave portion 124 under a state where the engagement plate 116 is engaged to the strikers 110 and 112. In this manner, the restriction keeps the engagement between the engagement plate 116 and the strikers 110 and 112.

The lock plate 117 is provided with a connecting portion 128, the connecting portion 128 being connected to an inner wire 127 of a Bowden wire (a Bowden cable) 126. The inner wire 127 of the Bowden wire 126 is connected to a handle tool 129 (refer to FIG. 11) disposed on a back surface of a lower portion of the front panel 32 (inside the cabin 3), thereby moving in synchronization with the handle tool 129.

The engagement portion 125 is separated from the engagement concave portion 124 when the Bowden wire 126 is operated by the handle tool 129 to pull the connecting portion 128 of the lock plate 117 toward the direction shown by an arrowed line Y. The engagement plate 116 becomes capable of turning toward the direction shown by the arrowed line X1 when the engagement portion 125 is separated from the engagement concave portion 124, and thereby the engagement plate 116 can separate from the strikers 110 and 112.

In addition, as shown in FIG. 10, a grip (a handle grip) 130 is disposed on the front panel 32. The grip 130 is disposed on a front surface of the lower portion of the front panel 32 (outside the cabin 3). The front panel 32 can be handled from the outside with the grasp of the grip 130. The grip 130 is provided with a release portion 131. The release portion 131 is capable of being manipulated (pushed). The manipulation (pushing) of the release portion 131 can operate the Borden wire 126.

As shown in FIG. 12, a guide rail 132 is disposed on the front portion of each of the side panels 31. The guide rail 132 is disposed, from an upper portion of the side panel 31 to the lower portion, on the side panel 31. In addition, as shown in FIG. 8 and FIG. 9, the guide rail 132 is fixed to an attachment plate 133 attached on the side panel 31.

As shown in FIG. 11, a roller 134 is disposed on each of a right side and a left side of a lower end of the front panel 32. The roller 134 disposed on the right side is engaged to the guide rail 132 disposed on the right side. The roller 134 disposed on the left side is engaged to the guide rail 132 disposed on the left side. Each of the rollers 134 is capable of moving along a longitudinal direction of the guide rail 132.

In addition, a support device 135 is disposed on an upper portion of the front portion of each of the side panels 31, the support device 135 being configured to support the front panel 32.

The support device 135 includes a swing link 136 and a gas spring 137.

The swing link 136 is pivotally supported on a bracket 138 by an upper pivot shaft 139 at one end (an upper portion) of the swing link 136, the bracket 138 being fixed to the roof 30. And, the swing link 136 is pivotally supported on a bracket 140 by a lower pivot shaft 141 at the other end (a lower portion) of the swing link 136, the bracket 140 being fixed to a side frame portion of the panel frame 102.

The gas spring 137 is pivotally supported on an upper portion of the swing link 136 at one end (an upper portion) of the gas spring 137. The gas spring 137 is pivotally supported on a bracket 142 at the other end (a lower portion) of the gas spring 137, the bracket 142 being fixed to the guide rail 132.

Considering the front panel 32 moving from the closing position S1 to the housing position S2, the engagement between the first striker 110 and the latch 114 is released at first, then the front panel 32 is moved from the closing position S1, shifting an upper portion of the front panel 32 backward. Then, the roller 134 moves from the lower portion of the guide rail 132 to the upper portion, and thus the lower portion of the front panel 32 moves upward. In this manner, the front panel 32 is positioned at a pre-housing position S3 under the housing position S2 as shown by the two-dot chain line in FIG. 12.

In the move of the front panel 32 from the closing position S1 to the housing position S3, the lower portion of the swing link 136 swings backward about the upper pivot shaft 139 with the move of the front panel 32. The above-described swing link 136 supports the front panel 32, allowing the move of the front panel 32. In addition, the gas spring 137 stretches to provide a rotational force to the swing link 136, the rotational force being applied backwardly upward (upwardly backward), thereby helping the move of the front panel 32.

Then, the front panel 32 is moved upward after the front panel 32 is moved to the pre-housing position S3, and thereby the front panel 32 is positioned at the housing position S2 and the latch 114 is engaged to the second striker 112.

In the following descriptions, a direction along a width of the front panel 32 is referred to as a panel width direction, the panel width direction being a direction shown by an arrowed line W in FIG. 14 and FIG. 15. In addition, a direction from a center of the width of the front panel 32 toward an end of the width of the front panel 32 is referred to as an outward panel width direction, the outward panel width direction being a direction shown by an arrowed line W1 in FIG. 11, FIG. 14, and FIG. 15. Moreover, a direction from the end of the width of the front panel 32 toward the center of the width of the front panel 32 is referred to as an inward panel width direction, the inward panel width direction being a direction shown by an arrowed line W2 in FIG. 11, FIG. 14, and FIG. 15.

As shown in FIG. 11, a pair of lock devices 143 is disposed on the lower portion of the front panel 32.

Figure 14:
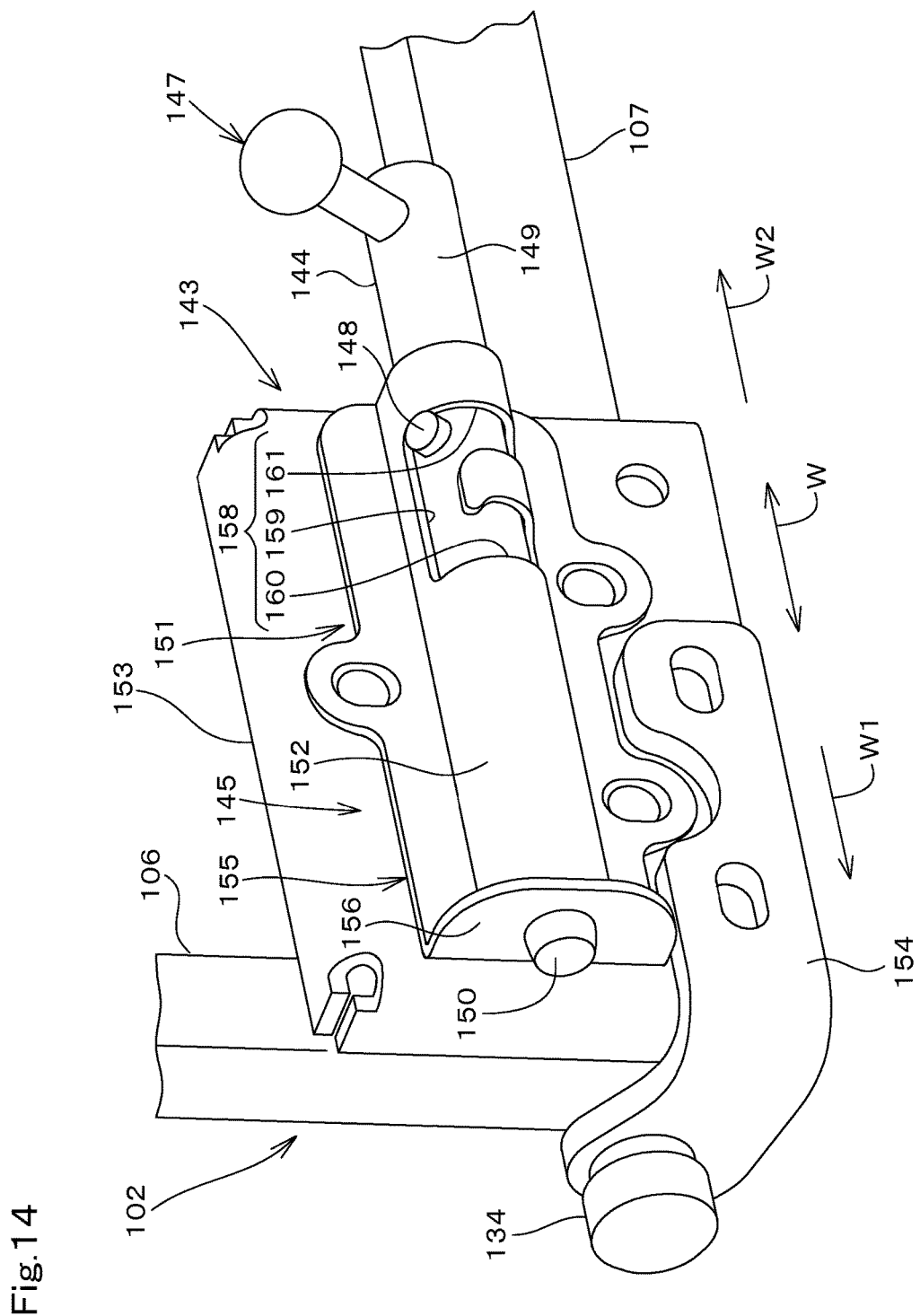
FIG. 14 is a perspective view of a lock device of and a roller of the front panel according to the embodiment.
Figure 15:
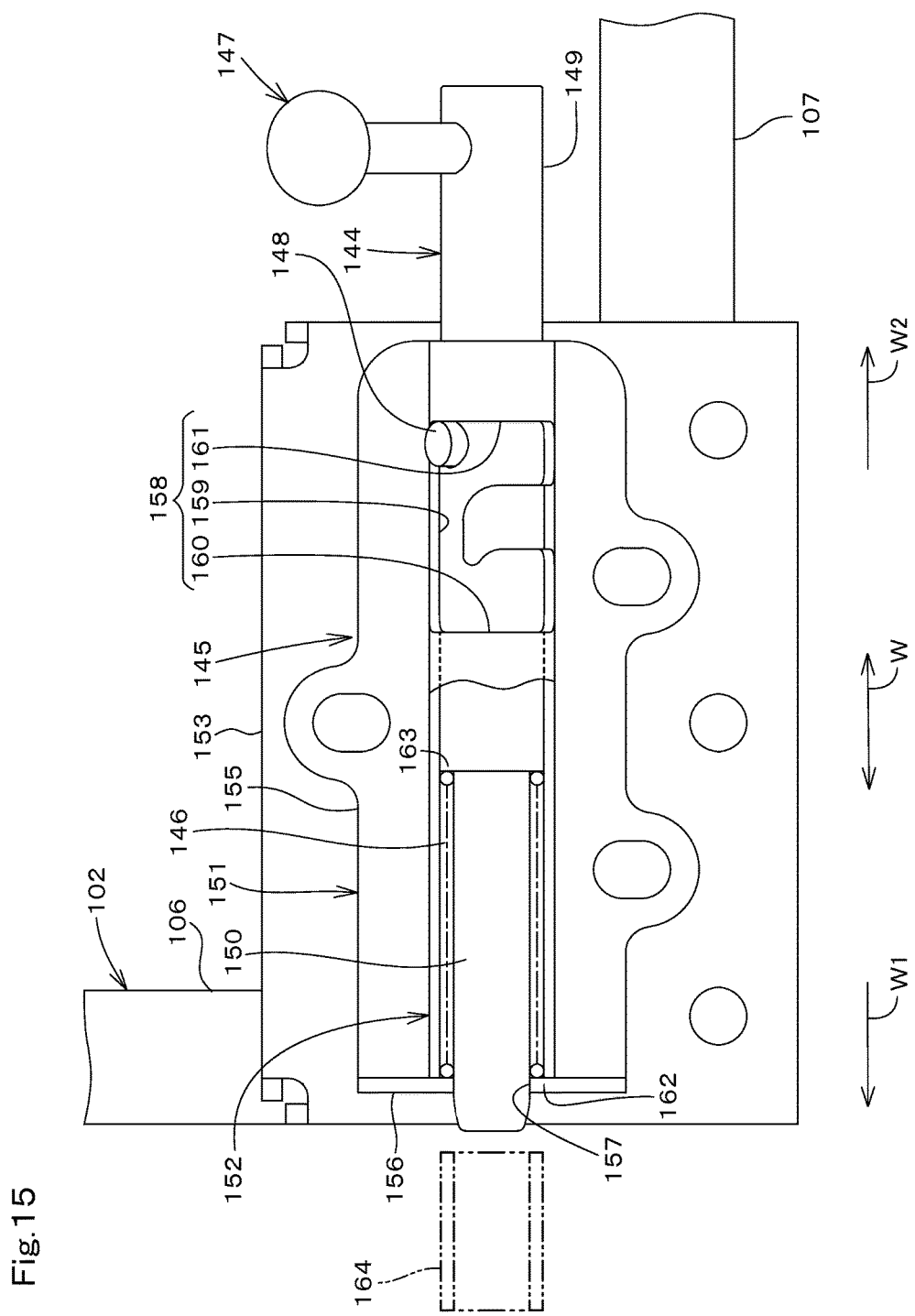
FIG. 15 is a back view of the lock device according to the embodiment.

As shown in FIG. 14 and FIG. 15, the lock device 143 includes a lock member 144, a support member 145, and a pressing member 146. the support member 145 supports the lock member 144. The pressing member 146 presses the lock member 144. FIG. 14 and FIG. 15 show the lock device 143 disposed on the left side.

The lock member 144 is constituted of a pin, the pin having an axis extending along the panel width direction W. The lock member 144 is provided with a manipulation knob 147 and an engagement member 148, the manipulation knob 147 being for manipulating the lock member 144, the engagement member 148 being for positioning the lock member 144.

The lock member 144 includes a large diameter portion 149 and a small diameter portion 150. The large diameter portion 149 has a cylindrical shape. The small diameter portion 150 has a cylindrical shape having a diameter smaller than that of the large diameter portion 149.

The lock member 144 includes a portion serving as the large diameter portion 149, the portion being inwardly in the inward panel width direction W2. The lock member 144 includes a portion serving as the small diameter portion 149, the portion being outwardly in the outward panel width direction W1. The manipulation knob 147 and the engagement member 148 are disposed on the large diameter portion 149. The manipulation knob 147 is disposed inwardly in the inward panel width direction W2 than the engagement member 148.

The support member 145 includes an attachment plate 151 and a guide member 152.

The attachment panel 151 is attached to a fixation member 153, the fixation member 153 being fixed to a panel frame 102.

One of the fixation members 153 is fixed to both of: a lower end portion of the side frame portion 105 of the panel frame 102; and an end portion of the lower frame portion 107 in the panel width direction W. The other one of the fixation members 153 is fixed to both of a lower end portion of the side frame portion 106 of the panel frame 102; and an end portion of the lower frame portion 107 in the panel width direction W. A support bracket 154 is attached to the fixation member 153, the support bracket 154 being configured to support the roller 134.

The attachment plate 151 includes a first plate portion 155 and a second plate portion 156. The first plate portion 155 is put on a back surface of the fixation member 153 to be overwrapped with the back surface, and is fixed to the fixation member 153 by bolts. The second plate portion 156 protrudes backward from an end portion of the first plate portion 155, the end portion being disposed in the outward panel width direction W1. A pin insertion hole 157 is formed in the second plate portion 156.

The guide member 152 is formed of a member extending along the panel width direction W, having a U-shape when seen from the side of the guide member 152. The guide member 152 is fixed to the first plate portion 155, the first plate portion 155 closing an opening side of the guide member 152 arranged on the first plate portion 155. The lock member 144 is inserted to the guide member 152. The small diameter portion 150 of the lock member 144 is inserted to the pin insertion hole 157, and moves (slides) in the pin insertion hole 157 along the panel width direction W. The large diameter portion 149 of the lock member 144 protrudes toward the inward panel width direction W2 from the guide member 152. The manipulation knob 147 is disposed on the protruding portion.

A guide slit 158 is formed in the guide member 152. The guide slit 158 is formed in the guide member 152 on a side being in the inward panel width direction W2. The engagement member 148 is disposed in the guide slit 158.

The guide slit 158 includes a first slit 159, a second slit 160, and a third slit 161.

The first slit 159 allows the engagement member 148 (the lock member 144) to move (slide) within a predetermined length along the panel width direction W. The second slit 160 and the third slit 161 restrict the moving (sliding) of the engagement member 148 (the lock member 144) in the panel width direction W.

The second slit 160 is formed on an end of the first slit 159 in the outward panel width direction W1. The third slit 161 is formed on an end of the first slit 159 in the inward panel width direction W2.

The engagement member 148 can be moved (slid) from the first slit 159 to the second slit 160 or from the first slit 159 to the third slit 161 by turning the lock member 144 about an axis of the lock member 144.

In the embodiment, the pressing member 146 is constituted of a coil spring, and is fitted externally to the small diameter portion 150. One end of the pressing member 146 contacts to the second plate portion 156. The other end of the pressing member 146 contacts to the large diameter portion 149. In this manner, a pressing force of the pressing member 146 is applied to press the lock member 144 toward the inward panel width direction W2. Since the lock member 144 is pressed toward the inward panel width direction W2, the lock member 144 is held at a position where the small diameter portion 150 of the lock member 144 does not protrude so much.

The pressing member 146 contacts to the second plate portion 156, and the second plate portion 156 includes a portion contacting to the pressing member 146 as a first receiving portion 162. The pressing member 146 contacts to the large diameter portion 149, and the large diameter portion 149 includes a portion contacting to the pressing member 146 as a second receiving portion 163.

As shown in FIG. 12, a holding member 164 is disposed on an upper portion of the front portion of each of the side panels 31. The holding member 164 is fixed to the attachment plate 133 as shown in FIG. 9.

The holding member 164 is formed of a cylindrical member, the cylindrical member having an axis extending along the panel width direction W.

As shown in FIG. 15, the holding member 164 and the lock member 144 are positioned corresponding to each other in the panel width direction W, that is, being opposite to each other, when the front panel 32 is positioned at the housing position S2.

Accordingly, after the front panel 32 is positioned at the housing position S2, the small diameter portion 150 protrudes much from the second plate portion 156 when the lock member 144 is moved (slid) toward the outward panel width direction W1 against the pressing force of the pressing member 146.

After the small diameter portion 150 is engaged (inserted) to the holding member 164, the lock member 144 is restricted from moving (sliding) backward from the holding member 164 when the engagement member 148 is positioned at (moved to) the second slit 160 by turning the lock member 144 about the axis of the lock member 144. In this manner, the small diameter portion 150 is inserted to the holding member 164 to be held by the holding member 164.

A side of the front panel 32 can be held at the housing position S2, the side being opposite to the side having the latch 114 of the front panel 32, when the small diameter portion 150 is inserted to the holding member 164 to be held by the holding member 164.

In the above-mentioned configurations, the front panel 32 moves between the closing position S1 and the housing position S2 under a state where the lock member 144 is separated (released) from the holding member 164. The lock member 144 is pressed toward the inward panel width direction W2 by the pressing member 146 in the move of the front panel 32, the inward panel width direction W2 being opposite to a direction of the insertion to the holding member 164, and thereby the lock member 144 scarcely protrudes from the front panel 32 toward the outward panel width direction W1. As described above, the lock member 144 scarcely protrudes from the front panel 32 toward the outward panel width direction W1 in moving the front panel 32 between the closing position S1 and the housing position S2. Accordingly, the lock member 144 can be prevented from hitting something (for example, the gas spring 137), thereby preventing the front panel 32 from being hard to be moved.

In addition, the latch 114 disposed on the front panel 32 is engaged to the first striker 110 at the closing position S1, the first striker 110 protruding downward, and is engaged to the second striker 112 at the housing position S2, the second striker 112 protruding forward. Thus, movement (shake and vibration) of the front panel 32 can be suppressed at both of the closing position S1 and the housing position S2 in the panel width direction W.

Meanwhile, the pressing member 146 is not necessarily limited to a coil spring, and may be other spring members.

As shown in FIG. 8 an operation member 60 (an operation device 60) is disposed inside the cabin 3. The operation member 60 is a device for operating the devices provided on the slid steer loader 1. The operation member 60 is disposed on a corner portion (an interior angle portion) between: the right frame portion 78 of the entrance frame 74; and a surface of the right side panel 31, the surface facing the operator seat 8. For details, the right side panel 31 has a hollow 61 between the inner rim portion 43 of the front plate portion 40F and the right frame portion 78. The operation member 60 is attached to an attachment plate 57, the attachment plate 57 being arranged in the hollow 61. In this manner, the operation member 60 does not protrude to the inside of the cabin 3, and accordingly a space of the cabin 3 can be utilized efficiently. Meanwhile, the operation member 60 may be disposed on a corner portion (an interior angle portion) between: the left frame portion 77; and a surface of the left side panel 31, the surface positioning on a side left to the operator seat 8.

The operation member 60 includes a plurality of switches. The switches serve as switches for operating a plurality of devices included in the skid steer loader 1. The switches can operate, for example, a wiper, a head lamp, and a cylinder lock. The switches are not limited to the above-mentioned switches. The plurality of switches are arranged in parallel with each other along the vertical direction. In this manner, the operation member 60 has a vertically-long and horizontally-short shape, that is, a vertically-elongated shape, thereby being easily housed in the hollow 61.

The operation member 60 is disposed closer to a lower portion of the cabin 3, concretely, the operation member 60 is disposed under a half of the whole height of the cabin 3. In this manner, an operator can easily access the operation member 60, sitting on the operator seat 8. The operator can operate the switches without hanging out of the operator seat 8 accordingly, and thus the operation member 60 according to the embodiment provides good operability.

In addition, since the operation member 60 is disposed closer to the lower portion of the cabin 3, a space can be easily created closer to the upper portion of the cabin 3, the space being used for arranging the above-mentioned members (the first striker 110, the bracket 111, and the support device 135) each for opening the front panel 32.

Moreover, the operation member 60 is arranged to orient a surface of the operation member 60 backward and diagonally-leftward, the surface having the above-mentioned switches. The surface having the switches is faced toward an operator sitting on the operator seat 8, and thus the operation member 60 according to the embodiment provides good operability. Meanwhile, considering a case where the operation member 60 is disposed on the above-mentioned left corner portion between the left frame portion 77 and the left side panel, the operation member 60 is disposed orienting the surface backward and diagonally-rightward, the surface having the switches.

Figure 18:
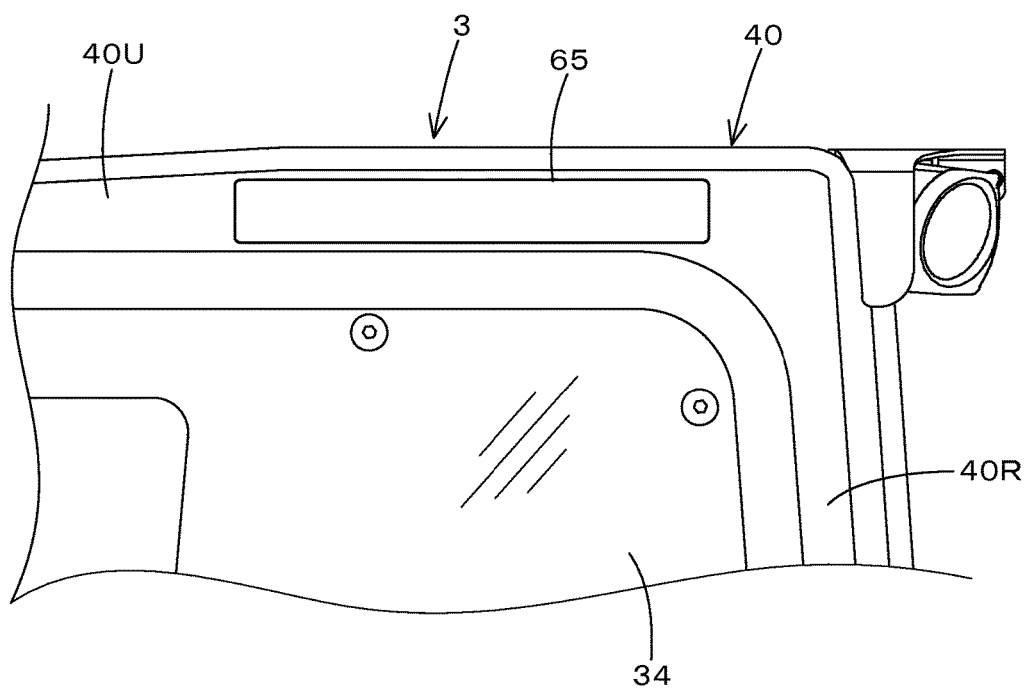
FIG. 18 is a view showing the upper back portion of the left side of the cabin according to the embodiment where a filter is detached.
Figure 20:
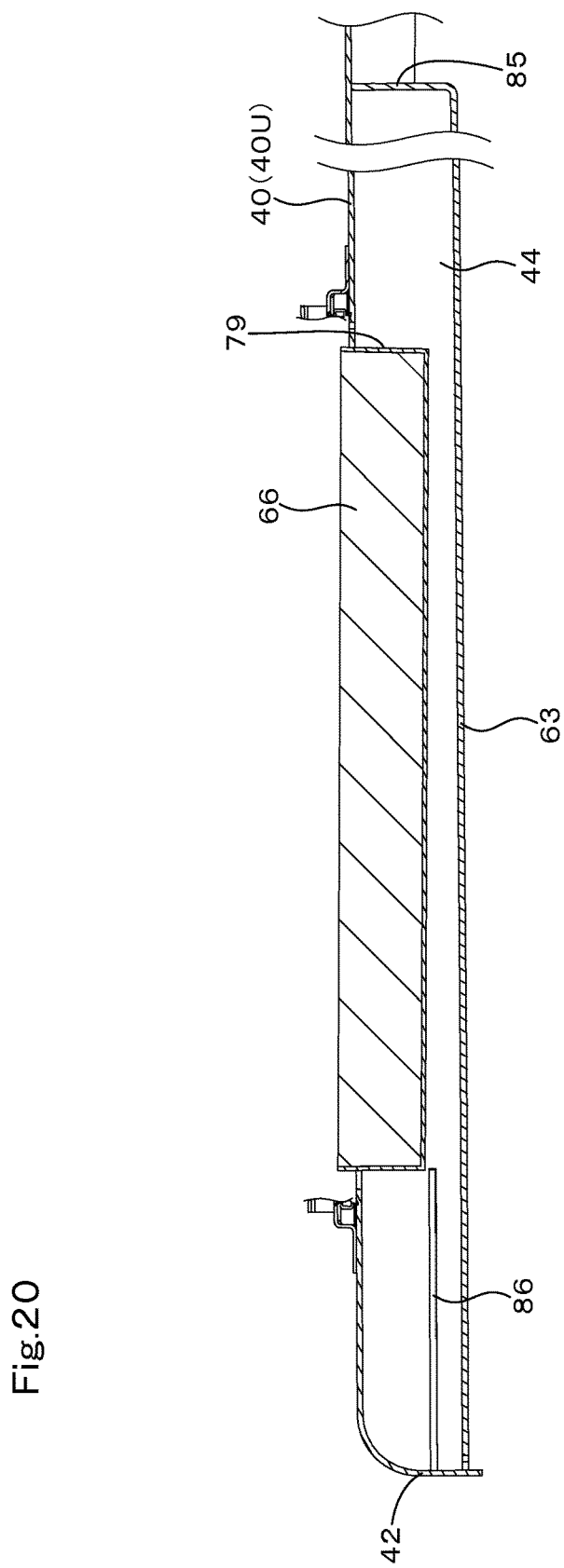
FIG. 20 is a horizontal cross-sectional view of the duct according to the embodiment.

Then, an air conditioner (not shown in the drawings) is disposed inside the cabin 3, the air conditioner being configured to condition the temperature in the cabin 3. As shown in FIG. 18 and FIG. 20, a circular (looped) rim 65 is formed on the outer peripheral portion 40 of the side panel 31, the circular rim 65 forming an opening (an external air inlet) for taking an external air to supply the taken air to the air conditioner. The rim 65 is formed, on an upper portion of the outer peripheral portion 40, closer to a rear portion of the side panel 31. For details, the rim 65 is disposed on a rear portion of the upper plate portion 40U of the outer peripheral portion 40. In other words, the rim 65 is positioned above a portion between the front wheel 5F and the rear wheel 5R of the skid steer loader 1.

Considering a case where the external air inlet of the air conditioner, that is, the rim 65 is disposed on or under a lower portion of the rear panel of the cabin 3, the external air inlet tends to suck earth, sand, and dust when the air conditioner is in operation, the earth, sand, and dust being deposited on an engine hood (a bonnet) of the skid steer loader 1. In addition, considering a case where the external air inlet is disposed on a side portion of the machine body 2, the external air inlet tends to suck earth and sand when the air conditioner is in operation, the earth and sand being bounced by a running tire of the skid steer loader 1.

In contrast, according to the present invention, the external air inlet is disposed, on the outer peripheral portion 40, closer to the rear portion of the side panel 31. In this manner, the external air inlet can be prevented from sucking: the earth, sand, and dust deposited on the engine hood; or the earth and sand bounced by the running tire, when the air conditioner is in operation. However, in the scope of the present invention, a position of the external air inlet (the rim 65) of the air conditioner is not necessarily limited to the example shown in the drawings. The external air inlet (the rim 65) may be disposed on the outer peripheral portion 40 at a position different from the example shown in the drawings.

A filter 66 is inserted to the external air inlet (the rim 65) of the air conditioner. In particular, a holding member 79 holds the filter 66 by sandwiching the filter 66 at an upper surface and a lower surface of the filter 66. The holding member 79 is fitted to the rim 65 and inserted (embedded) into the external air inlet. The holding member 79 has protruding portions 82, the protruding portions 82 protruding upward or downward. A seal member 83 is attached to each of the protruding portions 82.

Figure 16:
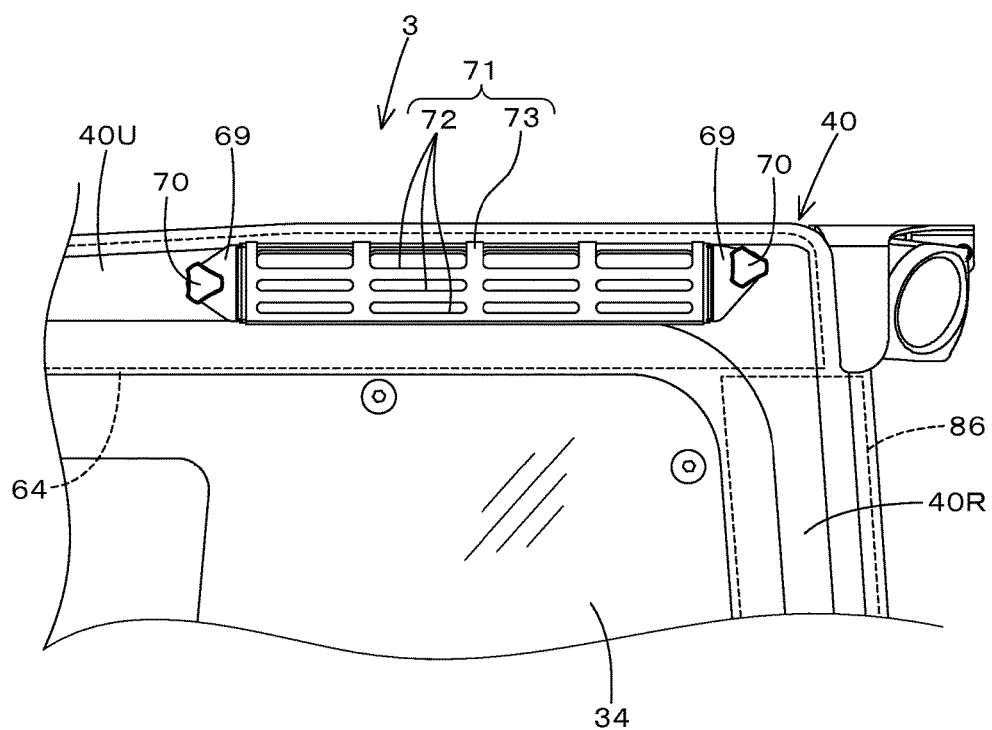
FIG. 16 is an enlarged view of an upper back portion of a left side of the cabin according to the embodiment.
Figure 17:
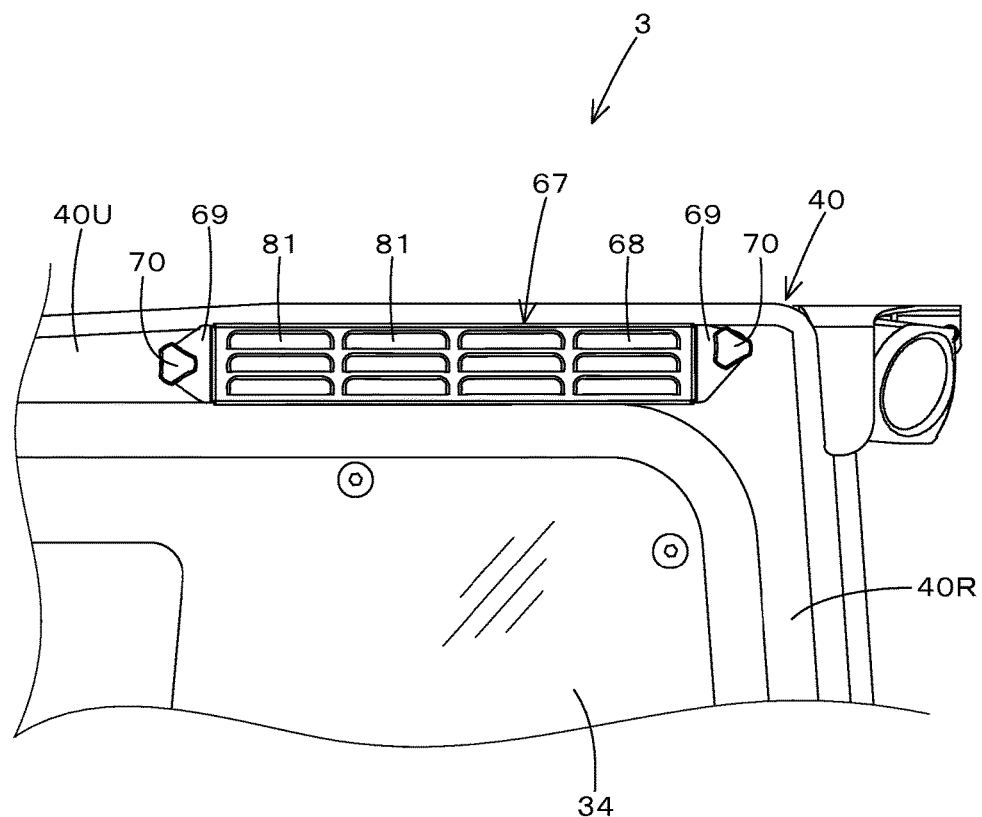
FIG. 17 is a view showing the upper back portion of the left side of the cabin according to the embodiment where a shield member is detached.
Figure 19:
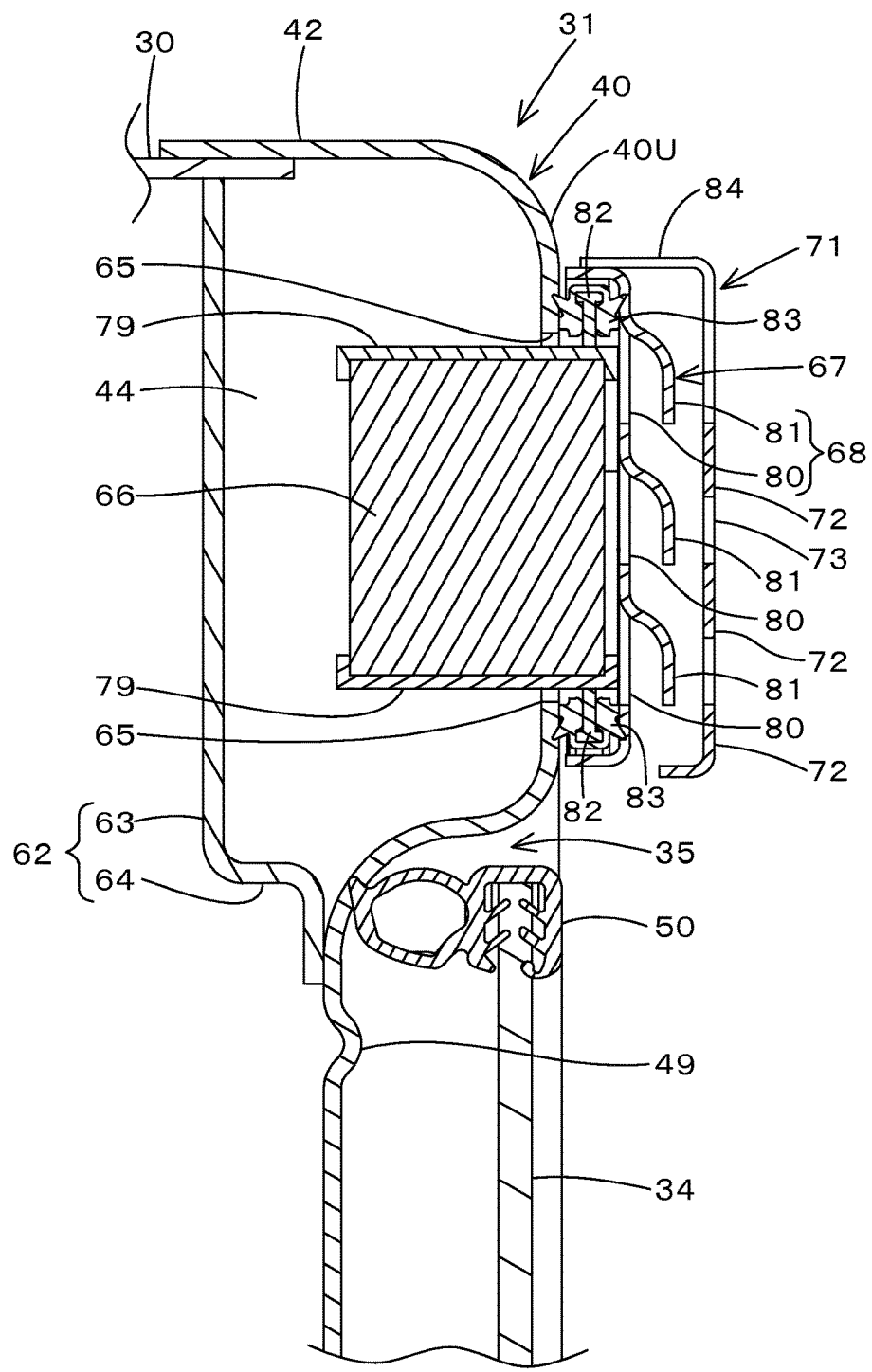
FIG. 19 is a vertical cross-sectional view of a duct of the cabin according to the embodiment.

As shown in FIG. 16 and FIG. 19, a cover 67 is disposed on an external side (on a side opposite to the hollow (inside member) 61) of the filter 66. The cover 67 includes a louver portion 68 and attachment portions 69. The louver portion 68 covers the filter 66 and has a plurality of air inlets (openings). The attachment portions 69 are attached to the outer peripheral portion 40, that is, to the upper plate portion 40U of the outer peripheral portion 40. As shown in FIG. 17 and FIG. 19, the louver portion 68 includes: a plurality of air inlets 80; and a plurality of visor portions 81 each disposed on an outside (a side opposite to the filter 66) of the corresponding air inlet 80, each of the visor portions 81 extending downward. In the example shown in FIG. 17, the cover 67 has: the plurality of air inlets 80 (four air inlets 80 in the drawing) arranged along the front to rear direction (or the rear to front direction) at predetermined intervals; and the plurality of air inlets 80 (three air inlets 80 in the drawing) arranged along the vertical direction at predetermined intervals. Each of the plurality of visor portions 81 is disposed on an outside of the corresponding air inlet 80.

One of the attachment portions 69 extends forward and is disposed in front of the louver portions 68, and the other one of the attachment portions 69 extends backward and is disposed in rear of the louver portions 68. Each of the attachment portions 69 has a through hole. A shaft portion of a knob bolt 70 is inserted to the through hole, the shaft portion is screwed to a female screw hole disposed on the upper plate portion 40U of the outer peripheral portion 40 of the side panel 31, and thereby the cover 67 is fixed to the outer peripheral portion 40 in a freely attachable and detachable manner.

As shown in FIG. 16 and FIG. 19, a shield member 71 is fixed externally on an outside of the louver portions 68 (on a side opposite to the outer peripheral portion 40). The shield member 71 includes a plurality of plates 72 (three plates 72 in the drawings) and a plurality of joint portions 73, the plates 72 extending along the front to rear direction (or the rear to front direction) and being arranged (disposed) vertically at predetermined intervals, the joint portions 73 each jointing the plates 72.

As shown in FIG. 19, the plate 72 is disposed on the outside of the louver portions 68 (on a side opposite to the filter 66) to form a space between the louver portion 68 and the plate 72. Five of the joint portions 73 vertically extend and are arranged (disposed) along the front to rear direction (or the rear to front direction) at predetermined intervals. A fixation portion 84 is disposed on upper ends of the joint portions 73, the fixation portion 84 being fixed to the cover 67. The fixation portion 84 is fixed to an upper rim portion of the cover 67 by welding, and thereby the cover 67 and the shield member 71 are integrally assembled.

Each of the plates 72 is arranged between the louver portions 68 being vertically adjacent to each other. In particular, each of the plates 72 is arranged between the visor portions 81 being vertically adjacent to each other.

Since the louver portion 68 includes the visor portion 81 extending downward, the louver portion 68 provides a good feature to block water coming from above (for example, rain water) so as to prevent the water from reaching the filter 66, However, the louver portion 68 does not provide sufficient feature to block water coming from below. The plates 72 of the shield member 71 are arranged between the louver portions 68 (specifically the visor portions 81) vertically adjacent to each other, thereby being capable of blocking the water coming from below. In this manner, considering a case where the water is splashed from below toward the cabin 3 by a hose in washing the skid steer loader 1, the water is prevented from entering into a duct 44. Accordingly, the filter 66 can be prevented from deteriorating, and the air conditioner can be prevented from performance deterioration, the performance deterioration being caused by the deterioration of the filter 66.

Meanwhile, as shown in FIG. 19 and FIG. 20, the air inlets 80 and the filter 66 are communicated with the duct 44, the duct 44 being disposed on an inside of the side panel 31 (the inside facing the operator seat 8). The outer peripheral portion 40 of the frame member 38 forms a part of the duct 44, the duct 44 being configured to take an external air to supply the taken air to the air conditioner.

A configuration of the duct 44 will be described in detail below.

The duct 44 is constituted of the outer peripheral portion 40 and an inside member 62. The inside member 62 is a member attached to an inside of the frame member 38 (the inside facing the operator seat 8). The outer peripheral portion 40 of the frame member 38 is fixed to the inside member 62 by welding, and the outer peripheral portion 40 and the inside member 62 are integrally assembled.

The inside member 62 includes a first plate portion 63 and a second plate portion 64.

The first plate portion 63 is a plate member opposite to the upper plate portion 40U of the outer peripheral portion 40. The first plate portion 63 is separated from the upper plate portion 40U toward the inside (inward), and the first plate portion 63 and the filter 66 are opposite to each other. A rear end of the first plate portion 63 is fixed to the outer rim portion 42 of the rear plate portion 40R. An upper end of the first plate portion 63 is formed on a lower surface of the roof 30 or on the outer rim portion 42 of the upper plate portion 40U.

The second plate portion 64 is opposite to the roof 30, is connected to the first plate portion 63 at a side (an inner side) of one end of the second plate portion 64, and is connected at a side (an outer side) of the other end of the second plate portion 64. For details, the second plate portion 64 extends toward the side panel 31 (the upper plate portion 40U of the outer peripheral portion 40) and extends downward being parallel to the side panel 31 (the upper plate portion 40U of the outer peripheral portion 40). In this manner, the duct 44 for air passage is formed of the first plate portion 63, the second plate portion 64, and the outer peripheral portion 40 (the upper plate portion 40U and the outer rim portion 42).

According to the above-mentioned configurations, the outer rim portion 42 of the upper plate portion 40U constitutes an upper wall of the duct 44, the upper plate portion 40U constitutes an outer wall of the duct 44, the first plate portion 63 of the inside member 62 constitutes an inner wall of the duct 44, and the second plate portion 64 of the inner member 62 constitutes a lower wall of the duct 44.

As described above, the outer peripheral portion 40 of the frame member 38 of the side panel 31 is used for a part of the duct 44, and thereby the duct 44 can be formed only by attaching the inside member 62 to an inside of the outer peripheral portion 40. The duct 44 can be simply formed of the small number of parts accordingly. In addition, the inside member 62 is fixed to and integrally assembled to the outer peripheral portion 40, and thereby reinforcing the side panel 31 to improve strength of the side panel 31, for example, bending strength.

Meanwhile, the inside member 62 may include a third plate portion 85 and a fourth plate portion 86. The third plate portion 85 is disposed between: a front end of the first plate portion 63; and the upper plate portion 40U. The third plate portion 85 is connected to the front end of the first plate portion 63 at one end (an inner side) of the third plate portion 85, and is connected to the upper plate portion 40U at the other end (an outer side) of the third plate portion 85.

The fourth plate portion 86 is a plate member being opposite to the rear plate portion 40R of the outer peripheral portion 40 and to the upper plate portion 40U. In particular, one end (an upper side) of the fourth plate portion 86 is opposite to the upper plate portion 40U, and an intermediate portion of and the other end (a lower side) of the fourth plate portion 86 are opposite to the rear plate portion 40R. A rear end of the fourth plate portion 86 is connected to the outer rim portion 42 of the rear plate portion 40R. Or, the rear end of the fourth plate portion 86 is disposed near (in the vicinity of) the outer rim portion 42 of the rear plate portion 40R. In this manner, the rear plate portion 40R, the outer rim portion 42 of the rear plate portion 40R, and the fourth plate portion 86 can constitute the duct 44 also on an inner side of the rear plate portion 40R.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A cabin comprising:
a frame member forming an entrance opening, the frame member being disposed in front of an operator seat;
a roof arranged above the operator seat;
a first panel configured to be capable of being moved to a first position where the front panel closes the entrance opening and to a second position between the operator seat and the roof;
a lock member disposed on the first panel, the lock member being configured to be freely movable;
a holding member configured to be engaged to the lock member to hold the first panel at the second position;
a pressing member configured to press the lock member toward a direction opposite to a direction of engaging to the holding member; and
a second panel disposed on a side of the operator seat, wherein the holding member is disposed on an upper portion of the front portion of the second panel.

2. The cabin according to claim 1, comprising:
a support member configured to support the lock member, the support member being disposed on the first panel;
a first receiving portion disposed on the support member; and
a second receiving portion disposed on the lock member, wherein
the pressing member is disposed between the first receiving portion and the second receiving portion.

3. A working machine comprising:
the cabin according to claim 1;
an operation device including:
a boom configured to freely swing upward and downward; and
an operation tool supported on a front portions of the boom; and
a travel device.

4. A cabin comprising:
a frame member forming an entrance opening, the frame member being disposed in front of an operator seat;
a roof arranged above the operator seat;
a first panel configured to be capable of being moved to a first position where the front panel closes the entrance opening and to a second position between the operator seat and the roof;
a lock member disposed on the first panel, the lock member being configured to be freely movable;
a holding member configured to be engaged to the lock member to hold the first panel at the second position;
a pressing member configured to press the lock member toward a direction opposite to a direction of engaging to the holding member; and
a first striker disposed on an upper portion of the frame member, the first striker projecting downward,
wherein the first panel includes:
a rim disposed on a portion corresponding to the first striker at the first position; and
a latch disposed on the rim, the latch being configured to be engaged to the first striker.

5. The cabin according to claim 4, comprising
a second striker configured to protrude forward and to be engaged to the latch at the second position, the second striker being disposed behind the operator seat and under the roof.

* * * * *